(12) United States Patent
Bouchy et al.

(10) Patent No.: US 9,586,828 B2
(45) Date of Patent: Mar. 7, 2017

(54) PROCESS FOR PRODUCING MIDDLE DISTILLATES BY HYDROCRACKING OF FEEDSTOCKS OBTAINED BY THE FISCHER-TROPSCH PROCESS IN THE PRESENCE OF A CATALYST COMPRISING AN IZM-2 SOLID

(75) Inventors: Christophe Bouchy, Lyon (FR); Emmanuelle Guillon, Vourles (FR)

(73) Assignees: ENI S.P.A., Rome (IT); IFP Energies Nouvelles, Rueil-Malmaison (FR)

( * ) Notice: Subject to any disclaimer, the term of this patent is extended or adjusted under 35 U.S.C. 154(b) by 1209 days.

(21) Appl. No.: 13/057,821

(22) PCT Filed: Jul. 29, 2009

(86) PCT No.: PCT/FR2009/000943
§ 371 (c)(1),
(2), (4) Date: Mar. 31, 2011

(87) PCT Pub. No.: WO2010/015737
PCT Pub. Date: Feb. 11, 2010

(65) Prior Publication Data
US 2011/0180455 A1    Jul. 28, 2011

(30) Foreign Application Priority Data
Aug. 8, 2008 (FR) ..................... 08/04560

(51) Int. Cl.
*C01B 39/48* (2006.01)
*B01J 29/74* (2006.01)
(Continued)

(52) U.S. Cl.
CPC ............... *C01B 39/48* (2013.01); *B01J 29/74* (2013.01); *B01J 29/76* (2013.01); *B01J 29/78* (2013.01);
(Continued)

(58) Field of Classification Search
CPC .......... C10G 2/30; C10G 45/62; C10G 45/64; C10G 47/16; C10G 47/18; C10G 47/20;
(Continued)

(56) References Cited

U.S. PATENT DOCUMENTS 4,539,193 A    9/1985  Valyocsik
5,207,893 A    5/1993  Iwamoto et al.
(Continued)

FOREIGN PATENT DOCUMENTS

EP    1 702 888 A1    9/2006
EP    1953118          8/2008
(Continued)

OTHER PUBLICATIONS

International Search Report of PCT/FR2009/000943 (Jan. 6, 2010).

*Primary Examiner* — Prem C Singh
*Assistant Examiner* — Brandi M Doyle
(74) *Attorney, Agent, or Firm* — Millen White Zelano & Branigan, P.C.

(57) ABSTRACT

The invention relates to a process for producing middle distillates from a paraffinic feedstock produced by Fischer-Tropsch synthesis, implementing a hydrocracking/hydroisomerization catalyst comprising at least one hydro-dehydrogenating metal selected from the group formed by the metals from group VIB and from group VIII of the periodic table and a substrate comprising at least one crystallized IZM-2 solid having a chemical composition, expressed on an anhydrous base, in terms of oxide moles, by the following general formula: $XO_2:aY_2O_3:bM_{2/n}O$, wherein X represents at least one tetravalent element, Y represents at least one trivalent element and M is at least one alkali metal and/or an alkaline earth metal of valency n, a and b representing respectively the number of moles of $Y_2O_3$ and $M_{2/n}O$ and a is between 0 and 0.5 and b is between 0 and 1.

16 Claims, 4 Drawing Sheets

(51) Int. Cl.
| | |
|---|---|
| *B01J 29/76* | (2006.01) |
| *B01J 29/78* | (2006.01) |
| *B01J 35/00* | (2006.01) |
| *B01J 37/02* | (2006.01) |
| *B01J 37/03* | (2006.01) |
| *B01J 37/08* | (2006.01) |
| *C10G 2/00* | (2006.01) |
| *C10G 45/62* | (2006.01) |
| *C10G 45/64* | (2006.01) |
| *C10G 47/16* | (2006.01) |
| *C10G 47/18* | (2006.01) |
| *C10G 47/20* | (2006.01) |
| *C10G 65/04* | (2006.01) |
| *C10G 65/12* | (2006.01) |

(52) U.S. Cl.
CPC ....... *B01J 35/0006* (2013.01); *B01J 35/0066* (2013.01); *B01J 37/0201* (2013.01); *B01J 37/033* (2013.01); *B01J 37/08* (2013.01); *C10G 2/30* (2013.01); *C10G 45/62* (2013.01); *C10G 45/64* (2013.01); *C10G 47/16* (2013.01); *C10G 47/18* (2013.01); *C10G 47/20* (2013.01); *C10G 65/043* (2013.01); *C10G 65/12* (2013.01); *B01J 2229/42* (2013.01); *C10G 2300/1022* (2013.01); *C10G 2300/301* (2013.01); *C10G 2300/4018* (2013.01); *C10G 2400/04* (2013.01)

(58) Field of Classification Search
CPC .................. C10G 65/043; C10G 65/12; C10G 2300/4018; C10G 2300/1022; C10G 2300/301; C10G 2400/04; C01B 39/48; B01J 29/74; B01J 29/76; B01J 29/78; B01J 35/0006; B01J 35/0066; B01J 37/0201; B01J 37/033; B01J 37/08; B01J 2229/42
USPC .................................................. 208/49, 106
See application file for complete search history.

(56) References Cited

U.S. PATENT DOCUMENTS

| | | |
|---|---|---|
| 7,771,703 B2 | 8/2010 | Guillon et al. |
| 2002/0005009 A1* | 1/2002 | Wittenbrink et al. .......... 44/436 |
| 2002/0144929 A1 | 10/2002 | Moore, Jr. et al. |
| 2002/0169218 A1 | 11/2002 | Moore, Jr. et al. |
| 2003/0019788 A1* | 1/2003 | Benazzi et al. ................. 208/57 |
| 2003/0057133 A1 | 3/2003 | Benazzi et al. |
| 2005/0205462 A1* | 9/2005 | Gopalakrishnan et al. .... 208/78 |
| 2006/0210472 A1 | 9/2006 | Hastoy et al. |

FOREIGN PATENT DOCUMENTS

| | | |
|---|---|---|
| WO | WO 03/004584 A1 | 1/2003 |
| WO | WO 2009/004131 A1 | 1/2009 |
| WO | WO 2009/144411 A2 | 12/2009 |
| WO | WO 2009/144412 A2 | 12/2009 |

* cited by examiner

PROCESS FOR PRODUCING MIDDLE DISTILLATES BY HYDROCRACKING OF FEEDSTOCKS OBTAINED BY THE FISCHER-TROPSCH PROCESS IN THE PRESENCE OF A CATALYST COMPRISING AN IZM-2 SOLID

The present invention relates to a process for producing middle distillates from a paraffinic feedstock produced by Fischer-Tropsch synthesis, implementing a hydrocracking/hydroisomerisation catalyst comprising at least one hydro-dehydrogenating metal selected from the group formed by the metals from group VIB and from group VIII of the periodic table and a substrate comprising at least one crystallised IZM-2 solid, having a chemical composition, expressed on an anhydrous base, in terms of oxide moles, by the following general formula: $XO_2:aY_2O_3:bM_{2/n}O$, wherein X represents at least one tetravalent element, Y represents at least one trivalent element and M is at least one alkali metal and/or an alkaline earth metal of valency n, a and b representing respectively the number of moles of $Y_2O_3$ and $bM_{2/n}O$ and a is between 0 and 0.5 and b is between 0 and 1.

PRIOR ART

In the Fischer-Tropsch process, synthesis gas ($CO+H_2$) is catalytically transformed into oxygen-containing products and into basically linear hydrocarbons in gaseous, liquid or solid form. These products are generally free of hetero-atomic impurities such as for example sulphur, nitrogen or metals. They also contain almost no or only a few aromatics, naphthenes and more generally cyclics, in particular in the case of cobalt catalysts. In contrast, they may have a non-negligible content of oxygen-containing products which, expressed as the weight of oxygen, is generally less than 5% by weight and also a content of unsaturated substances (olefinic products in general) which is generally less than 10% by weight. However, these products, consisting mainly of normal paraffins, cannot be used as they are, in particular because of their cold resistance properties which are not compatible with the usual uses of petroleum cuts. For example, the pour point of a linear hydrocarbon containing 20 carbon distillates cut range) is about +37° C., rendering its use impossible, as the specification is −15° C. for gas oil.

The starting feedstocks which are intended to be treated in a gasification unit producing a gas consisting basically of carbon monoxide and hydrogen, known to a person skilled in the art by the name of synthesis gas, said synthesis gas subsequently allowing a set of hydrocarbon cuts to be recomposed by means of the Fischer-Tropsch process, can be obtained from renewable sources such as, for example, lignocellulose-type feedstocks, such as wood or straw waste. Lignocellulose products are formed mainly from lignins and cellulose. The impurities contained in this type of lignocellulose biomass feedstock are basically solid impurities, in particular alkali, metals (Na, K) and sulphur-containing compounds, as well as chlorine-containing and nitrogen-containing compounds.

The starting feedstocks can also be obtained from renewable sources, such as oils and fats of vegetable or animal origin, or from mixtures of such feedstocks, containing triglycerides and/or fatty acids and/or esters. Of the possible vegetable oils, they may be crude or, totally or partially, refined, and obtained from the following vegetables: rape, sunflower, soya, palm, oil palm, olive, coconut, jatropha (this list not entailing any limitation). Algae or fish oils are also relevant. Of the possible fats, examples include all the animal fats such as lard or fats composed of residues from the food industry or obtained from the catering industries. The feedstocks thus defined contain triglyceride structures and/or fatty acids, the fatty chains of which contain a number of carbon atoms of between 8 and 25.

The starting feedstocks which are intended to be treated in a gasification unit producing a gas consisting basically of carbon monoxide and hydrogen, known to a person skilled in the art by the name of synthesis gas, said synthesis gas subsequently allowing a set of hydrocarbon cuts to be recomposed by means of the Fischer-Tropsch process, can also be obtained from coal which is finely ground and purified so as to contain a reduced concentration of ash.

The hydrocarbons obtained by the Fischer-Tropsch process, most of which comprise n-paraffins, have to be transformed into products which are more amenable to beneficiation, such as, for example, gas oil, kerosene, and are obtained, for example, after hydroisomerisation catalytic reactions.

All of the catalysts currently used in hydroisomerisation/hydrocracking are of the bifunctional type combining an acid function with a hydrogenating function. The acid function is provided by substrates having large surface areas (generally 150 to 800 $m^2.g^{-1}$) and superficial acidity, such as halogenated (in particular chlorine-containing or fluorine-containing) aluminas, phosphorus-containing aluminas, combinations of boron and aluminium oxides, and silica-aluminas. The hydrogenating function is provided either by one or more metals from group VIII of the periodic table of the elements, such as iron, cobalt, nickel, ruthenium, rhodium, palladium, osmium, iridium and platinum, or by a combination of at least one group VI metal, such as chromium, molybdenum and tungsten, and at least one group VIII metal.

The balance between the two functions, the acid function and the hydrogenating function, is one of the parameters governing the activity and the selectivity of the catalyst. A weak acid function and a strong hydrogenating function provide inactive catalysts which are selective in relation to isomerisation while a strong acid function and a weak hydrogenating function provide very active catalysts which are selective in relation to cracking. A third possibility is to use a strong acid function and a strong hydrogenating function in order to obtain a catalyst which is very active but also very selective in relation to isomerisation. It is therefore possible, by judiciously selecting each of the functions, to adjust the activity/selectivity pairing of the catalyst.

The conventional catalysts of catalytic hydrocracking consist, for the most part, of weakly acidic substrates, such as silica-aluminas for example. These systems are more specifically used to produce very good quality middle distillates. Substrates having low acidity include the family of the silica-aluminas. Many commercially available hydrocracking catalysts are based on silica-alumina combined with a group VIII metal. These systems have very good middle distillate selectivity, and the products formed are of very good quality (U.S. Pat. No. 6,733,657). The drawback of all these silica-alumina-based catalytic systems is, as stated hereinbefore, their low activity. Conversely, zeolite (in particular USY or beta zeolite)-based catalytic systems are very active for the hydrocracking reaction but unselective.

By attempting to develop catalysts for the hydrocracking and hydroisomerisation of paraffinic feedstocks such as the feedstocks obtained by Fischer-Tropsch synthesis, the applicant has discovered a process for producing middle distillates from a paraffinic feedstock produced by Fischer-Tropsch synthesis, implementing a new hydrocracking/hydroisomerisation catalyst comprising at least one hydro-dehydrogenating metal selected from the group formed by the metals from group VIB and from group VIII of the periodic table and a substrate comprising at least one crystallised IZM-2 solid.

Subject-Matter of the Invention

The present invention therefore relates to a process for the production of middle distillates. This process allows the quantity of middle distillates available to be increased by hydrocracking the heaviest paraffinic compounds, present in the effluent leaving the Fischer-Tropsch unit, and which have boiling points higher than those of the kerosene and gas oil cuts, for example the 370° C.+ fraction.

More specifically, the invention relates to a process for producing middle distillates from a paraffinic feedstock produced by Fischer-Tropsch synthesis implementing a particular catalyst as defined in the following description.

The present invention relates to a process for producing middle distillates from a paraffinic feedstock produced by Fischer-Tropsch synthesis, implementing a hydrocracking and hydroisomerisation catalyst comprising at least one hydro-dehydrogenating metal selected from the group formed by the metals from group VIB and from group VIII of the periodic table and a substrate comprising at least one crystallised IZM-2 solid, said process operating advantageously at a temperature of between 270 and 400° C., a pressure of between 1 and 9 MPa, a space velocity of between 0.5 and 5 h$^{-1}$, a hydrogen flow rate adjusted to obtain a ratio of from 400 to 1,500 normal liters of hydrogen per liter of feedstock.

DETAILED DESCRIPTION OF THE INVENTION

The present invention relates to a process for producing middle distillates from a paraffinic feedstock produced by Fischer-Tropsch synthesis, implementing a hydrocracking/hydroisomerisation catalyst comprising at least one hydro-dehydrogenating metal selected from the group formed by the metals from group VIB and from group VIII of the periodic table and a substrate comprising at least one crystallised IZM-2 solid displaying an X-ray diffraction pattern including at least the rays listed in the table hereinafter:

| 2 theta (°) | dhkl (Å) | Irel |
|---|---|---|
| 5.07 | 17.43 | ww |
| 7.36 | 12.01 | ss |
| 7.67 | 11.52 | ss |
| 8.78 | 10.07 | s |
| 10.02 | 8.82 | ww |
| 12.13 | 7.29 | ww |
| 14.76 | 6.00 | ww |
| 15.31 | 5.78 | ww |
| 15.62 | 5.67 | ww |
| 16.03 | 5.52 | ww |
| 17.60 | 5.03 | ww |
| 18.22 | 4.87 | ww |
| 19.01 | 4.66 | ww |
| 19.52 | 4.54 | ww |
| 21.29 | 4.17 | m |
| 22.44 | 3.96 | w |
| 23.10 | 3.85 | mw |
| 23.57 | 3.77 | w |
| 24.65 | 3.61 | ww |

-continued

| 2 theta (°) | dhkl (Å) | Irel |
|---|---|---|
| 26.78 | 3.33 | w |
| 29.33 | 3.04 | ww |
| 33.06 | 2.71 | ww |
| 36.82 | 2.44 | ww |
| 44.54 | 2.03 | ww | where ss=very strong; s=strong; m=moderate; mw=moderately weak; w=weak; ww=very weak and having a chemical composition, expressed on an anhydrous base, in terms of oxide moles, by the following general formula: $XO_2:aY_2O_3:bM_{2/n}O$, wherein X represents at least one tetravalent element, Y represents at least one trivalent element and M is at least one alkali metal and/or an alkaline earth metal of valency n, a and b representing respectively the number of moles of $Y_2O_3$ and $M_{2/n}O$ and a is between 0 and 0.5 and b is between 0 and 1.

Said process operates advantageously at a temperature of between 270 and 400° C. and preferably between 300 and 390° C., at a pressure of between 1 and 9 MPa and preferably between 2 and 8 MPa, at a space velocity of between 0.5 and 5 h$^{-1}$ and preferably between 0.8 and 3 h$^{-1}$, and at a hydrogen flow rate adjusted to obtain a ratio of from 400 to 1,500 normal liters of hydrogen per liter of feedstock and preferably a ratio of from 600 to 1,300 normal liters of hydrogen per liter of feedstock.

The Hydrocracking and Hydroisomerisation Catalyst

Preferably, said hydrocracking and hydroisomerisation catalyst comprises from 0.1 to 60%, preferably from 0.1 to 50% and even more preferably from 0.1 to 40% of at least one hydro-dehydrogenating metal selected from the group formed by the group VIB and group VIII metals, and from 40 to 99.9% of a substrate comprising:

0 to 99% and preferably 2 to 98%, preferably from 5 to 95% of at least one oxide-type amorphous or poorly crystallised porous inorganic binder from 0.01 to 60%, preferably from 0.05 to 40%, preferably from 0.05 to 35% and very preferably from 0.05 to 20% of an IZM-2-type crystallised solid, the percentages being expressed in percentage by weight relative to the total mass of the catalyst.

a) The Hydro-Dehydrogenating Function

According to the invention, the catalyst comprises at least one hydro-dehydrogenating metal selected from the group formed by the VIII metals and the group VIB metals, taken alone or in a mixture.

Preferably, the group VIII elements are selected from iron, cobalt, nickel, ruthenium, rhodium, palladium, osmium, iridium or platinum, taken alone or in a mixture.

If the group VIII elements are selected from the group VIII noble metals, the group VIII elements are advantageously selected from platinum and palladium.

If the group VIII elements are selected from the group VIII non-noble metals, the group VIII elements are advantageously selected from iron, cobalt and nickel.

Preferably, the group VIB elements of the catalyst according to the present invention are selected from tungsten and molybdenum.

If the hydrogenating function comprises a group VIII element and a group VIB element, the following combinations of metals are preferred: nickel/molybdenum, cobalt/molybdenum, iron/molybdenum, iron/tungsten, nickel/tungsten, cobalt/tungsten, and very preferably: nickel/molybdenum, cobalt/molybdenum, nickel/tungsten. It is also possible to use combinations of three metals such as, for example, nickel/cobalt/molybdenum. When a combination of group VIB and group VIII metals is used, the catalyst is then preferably used in a sulphided form.

The hydro-dehydrogenating element content of said catalyst according to the present invention selected from the group formed by the group VIB at the group VIII metals is advantageously between 0.1 and 60% by weight relative to the total mass of said catalyst, preferably between 0.1 and 50% by weight and very preferably between 0.1 and 40% by weight.

When the hydro-/dehydrogenating element is a group VIII noble metal, the catalyst contains preferably a noble metal content of between 0.05 and 10% by weight, even more preferably from 0.1 to 5% by weight relative to the total mass of said catalyst.

b) The Crystallised IZM-2 Solid

According to the invention, the substrate of the catalyst according to the invention comprises at least one crystallised IZM-2 solid having a chemical composition expressed on an anhydrous base, in terms of oxide moles, by the following general formula: $XO_2:aY_2O_3:bM_{2/n}O$, wherein X represents at least one tetravalent element, Y represents at least one trivalent element and M is at least one alkali metal and/or an alkaline earth metal of valency n, a and b representing respectively the number of moles of $Y_2O_3$ and $bM_{2/n}O$ and a is between 0 and 0.5 and b is between 0 and 1.

According to the invention, the crystallised IZM-2 solid used in the substrate of the catalyst implemented in the process according to the invention displays an X-ray diffraction pattern including at least the rays listed in Table 1. This new crystallised IZM-2 solid has a new crystalline structure.

This diffraction pattern is advantageously obtained by X-ray crystallographic analysis by means of a diffractometer using the conventional method of powders with Kα1 radiation of copper (λ=1.5406 Å). From the position, represented by the angle 2θ, of the diffraction peaks, the characteristic reticular equidistances $d_{hkl}$ of the sample are calculated by way of Bragg's law. The error of measurement $\Delta(d_{hkl})$ over $d_{hkl}$ is calculated owing to Bragg's law as a function of the absolute error $\Delta(2\theta)$ allocated to the measurement of 2θ. An absolute error $\Delta(2\theta)$ equal to ±0.02° is commonly accepted. The relative intensity $I_{rel}$ allocated to each value of $d_{hkl}$ is measured in accordance with the height of the corresponding diffraction peak. The X-ray diffraction pattern of the crystallised IZM-2 solid according to the invention comprises at least the rays at the values of $d_{hkl}$ given in Table 1. The column of the $d_{hkl}$ values shows the average values of the inter-reticular distances in Angstroms (Å). Each of these values must be modified by the error of measurement $\Delta(d_{hkl})$ of between ±0.6 Å and ±0.01 Å.

TABLE 1

Average values of the $d_{hkl}$ values and relative intensities measured on an X-ray diffraction pattern of the calcined crystallised IZM-2 solid

| 2 theta (°) | dhkl (Å) | Irel |
|---|---|---|
| 5.07 | 17.43 | ww |
| 7.36 | 12.01 | ss |
| 7.67 | 11.52 | ss |
| 8.78 | 10.07 | s |
| 10.02 | 8.82 | ww |
| 12.13 | 7.29 | ww |
| 14.76 | 6.00 | ww |
| 15.31 | 5.78 | ww |
| 15.62 | 5.67 | ww |

TABLE 1-continued

Average values of the $d_{hkl}$ values and relative intensities measured on an X-ray diffraction pattern of the calcined crystallised IZM-2 solid

| 2 theta (°) | dhkl (Å) | Irel |
|---|---|---|
| 16.03 | 5.52 | ww |
| 17.60 | 5.03 | ww |
| 18.22 | 4.87 | ww |
| 19.01 | 4.66 | ww |
| 19.52 | 4.54 | ww |
| 21.29 | 4.17 | m |
| 22.44 | 3.96 | w |
| 23.10 | 3.85 | mw |
| 23.57 | 3.77 | w |
| 24.65 | 3.61 | ww |
| 26.78 | 3.33 | w |
| 29.33 | 3.04 | ww |
| 33.06 | 2.71 | ww |
| 36.82 | 2.44 | ww |
| 44.54 | 2.03 | ww |

The relative intensity $I_{rel}$ is given in relation to a relative intensity scale in which it is allocated a value of 100 at the most intense ray of the X-ray diffraction pattern: ff<15; 15≤f<30; 30≤mw<50; 50≤m<65; 65≤s<85; ss≥85.

The crystallised IZM-2 solid used in the substrate of the catalyst implemented in the process according to the invention has advantageously a new crystalline basic or topological structure which is characterised by its X-ray diffraction pattern in the calcined form given by FIG. 1.

Said IZM-2 solid has advantageously a chemical composition expressed on an anhydrous base, in terms of oxide moles, defined by the following general formula: $XO_2:aY_2O_3:bM_{2/n}O$, wherein X represents at least one tetravalent element, Y represents at least one trivalent element and M is at least one alkali metal and/or an alkaline earth metal of valency n. In said formula provided hereinbefore, a represents the number of moles of $Y_2O_3$ and a is between 0 and 0.5, very preferably between 0 and 0.05 and even more preferably between 0.0016 and 0.02 and b represents the number of moles of $bM_{2/n}O$ and is between 0 and 1, preferably between 0 and 0.5 and even more preferably between 0.005 and 0.5.

Preferably, X is selected from silicon, germanium, titanium and the mixture of at least two of these tetravalent elements; very preferably, X is silicon and Y is preferably selected from aluminium, boron, iron, indium and gallium; very preferably, Y is aluminium. M is preferably selected from lithium, sodium, potassium, calcium, magnesium and the mixture of at least two of these metals and, very preferably, M is sodium. Preferably, X represents silicon, said crystallised IZM-2 solid is then an entirely silicic solid when the element Y is absent from the composition of said IZM-2 solid. It is also advantageous to employ as the element X a mixture of a plurality of elements X, in particular a mixture of silicon with another element X selected from germanium and titanium, preferably germanium. Thus, when silicon is present mixed with another element X, said crystallised IZM-2 solid is then a crystallised metallosilicate displaying an X-ray diffraction pattern identical to that described in Table 1 when it is in its calcined form. Even more preferably and in the presence of an element Y, X being silicon and Y being aluminium: said crystallised IZM-2 solid is then a crystallised aluminosilicate displaying an X-ray diffraction pattern identical to that described in Table 1 when it is in its calcined form.

More generally, said IZM-2 solid used in the substrate of the catalyst implemented in the process according to the invention has advantageously a chemical composition expressed by the following general formula: $XO_2:aY_2O_3:bM_{2/n}O:cR:dH_2O$, wherein R represents an organic species comprising two quaternary nitrogen atoms, X represents at least one tetravalent element, Y represents at least one trivalent element and M is an alkali metal and/or an alkaline earth metal of valency n; a, b, c and d representing respectively the number of moles of $Y_2O_3$, $M_{2/n}O$, R and $H_2O$ and a is between 0 and 0.5, b is between 0 and 1, c is between 0 and 2 and d is between 0 and 2. This formula and the values assumed by a, b, c and d are those for which said IZM-2 solid is preferably in its calcined form.

More specifically, said IZM-2 solid, in its crude synthesis form, has advantageously a chemical composition expressed by the following general formula: $XO_2:aY_2O_3:bM_{2/n}O:cR:dH_2O$ (I), wherein R represents an organic species comprising two quaternary nitrogen atoms, X represents at least one tetravalent element, Y represents at least one trivalent element and M is an alkali metal and/or an alkaline earth metal of valency n; a, b, c and d representing respectively the number of moles of $Y_2O_3$, $M_{2/n}O$, R and $H_2O$ and a is between 0 and 0.5, b is between 0 and 1, c is between 0.005 and 2 and preferably between 0.01 and 0.5, and d is between 0.005 and 2 and preferably between 0.01 and 1.

In Formula (I) provided hereinbefore to define the chemical composition of said crystallised IZM-2 solid in its crude synthesis form, the value of a is between 0 and 0.5, very preferably between 0 and 0.05 and even more preferably between 0.0016 and 0.02. Preferably, b is between 0 and 1; very preferably, b is between 0 and 0.5 and, even more preferably, b is between 0.005 and 0.5. The value of c is between 0.005 and 2, advantageously between 0.01 and 0.5. The value assumed by d is between 0.005 and 2, preferably between 0.01 and 1.

In its crude synthesis form, i.e. directly obtained from the synthesis and prior to any calcining step well known to a person skilled in the art, said IZM-2 solid comprises advantageously at least the organic species R having two quaternary nitrogen atoms such as that described hereinafter or else its decomposition products or else its precursors. According to a preferred mode of the invention, in Formula (I) provided hereinbefore, the element R is 1,6-bis(methylpiperidinium)hexane, the structural formula of which is provided hereinafter. Said organic species R, which acts as a structuring agent, can be eliminated via the conventional routes known in the art, such as heat and/or chemical treatments.

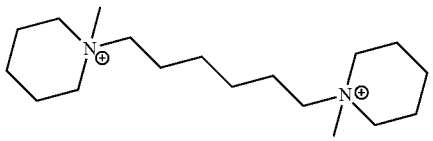 [SMILES: C[N+]1(CCCCCC[N+]2(C)CCCCC2)CCCCC1]

A process for preparing said crystallised IZM-2 solid consists advantageously in reacting an aqueous mixture comprising at least one source of at least one $XO_2$ oxide, optionally at least one source of at least one $Y_2O_3$ oxide, optionally at least one source of at least one alkali metal and/or alkaline earth metal of valency n, at least one organic species R comprising two quaternary nitrogen atoms, the mixture having preferably the following molar composition:

$XO_2/Y_2O_3$: at least 2, preferably at least 20, more preferably from 60 to 600, $H_2O/XO_2$: 1 to 100, preferably from 10 to 70, $R/XO_2$: 0.02 to 2, preferably from 0.05 to 0.5, $M_{2/n}O/XO_2$: 0 to 1, preferably from 0.005 and 0.5, where X is one or more tetravalent element(s) selected from the group formed by the following elements: silicon, germanium, titanium, preferably silicon, where Y is one or more trivalent element(s) selected from the group formed by the following elements: aluminium, iron, boron, indium and gallium, preferably aluminium and where M is one or more alkali metal(s) and/or alkaline earth metal(s) selected from lithium, sodium, potassium, calcium, magnesium and the mixture of at least two of these metals, preferably sodium.

According to the process for preparing said crystallised IZM-2 solid, R is advantageously an organic species having two quaternary nitrogen atoms acting as an organic structuring agent. Preferably, R is the nitrogen-containing compound 1,6-bis(methylpiperidinium)hexane. The anions associated with the quaternary ammonium cations present in the structuring organic species for the synthesis of said crystallised IZM-2 solid are advantageously selected from the acetate anion, the sulphate anion, the carboxylate anion, the tetrafluoroborate anion, the halide anions such as fluoride, chloride, bromide, iodide, the hydroxide anion and a combination of a plurality thereof. Preferably, the anions associated with the quaternary ammonium cations present in the structuring species for the synthesis of the crystallised IZM-2 solid are selected from the hydroxide anion and the bromide anion. Said nitrogen-containing organic species used as the structuring agent of said crystallised IZM-2 solid is advantageously synthesised by any method known to a person skilled in the art. For the synthesis of 1,6-bis(methylpiperidinium)hexane dibromide, one mole of 1,6-dibromohexane and at least 2 moles of N-methylpiperidine are advantageously mixed in ethanol. Generally, the mixture is refluxed over a period of between 3 and 10 hours. After filtration, precipitation by means of an ethereal solvent such as diethyl ether, then recrystallisation in an ethanol/ether mixture, 1,6-bis(methylpiperidinium)hexane dibromide is obtained. 1,6-bis(methylpiperidinium)hexane dihydroxide is preferably obtained by treatment at ambient temperature of an aqueous solution of 1,6-bis(methylpiperidinium)hexane dibromide by silver oxide $Ag_2O$.

The source of the element X, employed for carrying out the process for preparing said crystallised IZM-2 solid, may advantageously be any compound which comprises the element X and can release this element in aqueous solution in a reactive form. Advantageously, when the element X is silicon, the silica source may be any one of those commonly used in the synthesis of zeolites, for example powdered solid silica, silicic acid, colloidal silica, dissolved silica or tetraethoxysilane (TEOS). Of the powdered silicas, use may advantageously be made of precipitated silicas, in particular those obtained by precipitation from an alkali metal silicate solution, such as aerosil silicas, pyrogenic silicas, for example "CAB-O-SIL" and silica gels. Use may be made of colloidal silicas having various particle sizes, for example having an average equivalent diameter of between 10 and 15 nm or between 40 and 50 nm such as those sold under the registered trade marks such as "LUDOX". Preferably, the silicon source is LUDOX AS-40.

The source of the element Y, optionally employed for carrying out the process for preparing said crystallised IZM-2 solid, may advantageously be any compound which comprises the element Y and can release this element in aqueous solution in a reactive form. In the preferred case where Y is aluminium, the alumina source is preferably sodium aluminate, or an aluminium salt, for example chloride, nitrate, hydroxide or sulphate, an aluminium alkoxide or alumina proper, preferably in hydrated or hydratable form, such as for example colloidal alumina, pseudoboehmite, gamma alumina or alpha or beta trihydrate. Mixtures of the sources cited hereinbefore can also be used.

For the source of alkali metal M and/or alkaline earth metal of valency n, use is advantageously made of a halide or a hydroxide of said metal M, preferably a hydroxide of said metal M.

For carrying out the process for preparing said IZM-2 solid, it is preferred for the aqueous mixture, comprising at least one source of at least one $XO_2$ oxide, optionally at least one source of at least one $Y_2O_3$ oxide, optionally at least one source of at least one alkali and/or alkaline earth metal of valency n, at least one organic species R having two quaternary nitrogen atoms, to comprise also at least one source of hydroxide ions. Said source of hydroxide ions originates advantageously from the structuring organic species R when it is in its hydroxide form, namely 1,6-bis (methylpiperidinium)hexane dihydroxide, or else from the source of alkali and/or alkaline earth metal M when it is in hydroxide form, for example sodium hydroxide.

Therefore, according to a preferred embodiment of the process for preparing said crystallised IZM-2 solid, an aqueous mixture comprising a silicon oxide, optionally alumina, 1,6-bis(methylpiperidinium)hexane dibromide and sodium hydroxide is reacted. According to another preferred embodiment of the process according to the invention, an aqueous mixture comprising a silicon oxide, optionally alumina and 1,6-bis(methylpiperidinium)hexane dihydroxide, is reacted.

The process for preparing said crystallised IZM-2 solid consists advantageously in preparing an aqueous reaction mixture called a gel and containing at least one source of at least one $XO_2$ oxide, optionally at least one source of at least one $Y_2O_3$ oxide, at least one organic species R, optionally at least one source of at least one alkali and/or alkaline earth metal of valency n. The quantities of said reagents are advantageously adjusted in such a way as to impart to this gel a composition allowing crystallisation thereof in a crystallised IZM-2 solid in its crude synthesis form of general formula (I) $XO_2:aY_2O_3:bM_{2/n}O:cR:dH_2O$, where a, b, c and d meet the criteria defined hereinbefore when c and d are greater than 0. Then, the gel is subjected to a hydrothermal treatment until said crystallised IZM-2 solid is formed. The gel is advantageously placed under hydrothermal conditions under an autogenous reaction pressure, optionally while adding gas, for example nitrogen, at a temperature of between 120° C. and 200° C., preferably between 140° C. and 180° C., and even more preferably between 160 and 175° C. until the solid IZM-2 crystals are formed in its crude synthesis form. The period of time necessary to obtain crystallisation varies generally between 1 hour and several months as a function of the composition of the reagents in the gel, the stirring and the reaction temperature. Preferably, the crystallisation period varies between 2 hours and 21 days. The reacting is carried out generally while stirring or in the absence of stirring, preferably in the presence of stirring.

It may be advantageous to add seeds to the reaction mixture in order to reduce the time required to form the crystals and/or the total crystallisation period. It may also be advantageous to use seeds in order to promote the formation of said crystallised IZM-2 solid to the detriment of impurities. Seeds of this type comprise advantageously crystallised solids, in particular crystals of IZM-2 solid. The crystalline seeds are generally added in a proportion of between 0.01 and 10% of the mass of the $XO_2$ oxide used in the reaction mixture.

At the end of the hydrothermal treatment step leading to the crystallisation of said IZM-2 solid, the solid phase is advantageously filtered, washed, dried and then calcined. The calcining step is performed advantageously by way of one or more heating steps carried out at a temperature of between 100 and 1,000° C., preferably between 400 and 650° C., for a period of between a few hours and several days, preferably between 3 hours and 48 hours. Preferably, the calcining is carried out in two consecutive heating steps.

At the end of said calcining step, said IZM-2 solid obtained is advantageously that displaying the X-ray diffraction pattern including at least the rays listed in Table 1. It contains neither water nor the organic species R which are present in the IZM-2 solid in its crude synthesis form.

After calcining, the IZM-2 solid entering the composition of the substrate of the catalyst according to the invention is advantageously exchanged by at least one treatment with a solution of at least one ammonium salt in such a way as to obtain the ammonium form of the IZM-2 solid which, once calcined, leads to the ($H^+$) acid form of said IZM-2 solid. This exchange step can be carried out at any stage of the preparation of the catalyst, i.e. after the step of preparing the IZM-2 solid, after the step of shaping the IZM-2 solid (by pelletising or by way of a porous inorganic binder), or else after the step of introducing the hydro-dehydrogenating metal. Preferably, the exchange step is carried out after the step of shaping the IZM-2 solid.

Said IZM-2 solid entering the composition of the substrate of the catalyst used in the process according to the invention is advantageously at least partially, preferably almost totally, in acid form, i.e. in ($H^+$) acid form. The M/Y atomic ratio is generally advantageously less than 0.1 and preferably less than 0.05 and even more preferably less than 0.01.

c) The Inorganic Binder

The catalyst used in the process according to the invention can advantageously contain an oxide-type amorphous or poorly crystallised porous inorganic binder, the preferred binder being of the alumina type. The alumina compounds advantageously used in accordance with the invention are partially soluble in an acidic medium. They are advantageously selected entirely or partially from the group of the alumina compounds of general formula $Al_2O_3$, $nH_2O$. Use may in particular be made of hydrated alumina compounds such as: hydrargillite, gibbsite, bayerite, boehmite, pseudoboehmite and amorphous or basically amorphous alumina gels. It is also possible advantageously to implement the dehydrated forms of these compounds which consist of transition aluminas and which comprise at least one of the phases taken from the following group: rho, chi, eta, gamma, kappa, theta, and delta, which differ basically in terms of the organisation of their crystalline structure. Alpha alumina, commonly called corundum, can advantageously be incorporated in a low proportion into the substrate according to the invention.

The aluminium hydrate $Al_2O_3$, $nH_2O$, which is more preferably used, is advantageously boehmite, pseudoboehmite and amorphous or basically amorphous alumina gels. A mixture of these products, in any desired combination, can also be used.

Boehmite is generally described as an aluminium monohydrate of formula $Al_2O_3$, $nH_2O$ which encompasses in reality a broad continuum of materials of variable degrees of hydration and organisation with more or less well-defined boundaries: the most hydrated gelatinous boehmite, wherein n may be greater than 2, pseudoboehmite or microcrystalline boehmite wherein n is between 1 and 2, then crystalline boehmite and finally boehmite which is well crystallised in large crystals wherein n is about 1. The morphology of aluminium monohydrate can advantageously vary within broad limits between these two extreme acicular or prismatic forms. An entire set of variable forms can be used: chain, boats, interlaced plates.

Relatively pure aluminium hydrates can advantageously be used in powdered form, amorphous or crystallised or crystallised containing an amorphous portion. Aluminium hydrate can also advantageously be introduced in the form of aqueous suspensions or dispersions. The aqueous aluminium hydrate suspensions or dispersions implemented in the invention may advantageously be gelifiable or coagulable. The aqueous dispersions or suspensions can also advantageously be obtained, as is well known to a person skilled in the art, by peptisation in water or water acidulated with aluminium hydrates.

Aluminium hydrate can advantageously be dispersed by any process known to a person skilled in the art: in a batch reactor, a continuous mixer, a kneader, a colloid mill. Such mixing can advantageously also be carried out in a plug flow reactor and, in particular, in a static mixer. Examples include Lightnin reactors.

Furthermore, the alumina source implemented may also advantageously be an alumina having been subjected beforehand to a treatment likely to improve its degree of dispersion. By way of example, the dispersion of the alumina source may be improved by a preliminary homogenising treatment. By way of homogenising, use may advantageously be made of at least one of the homogenising treatments described hereinafter.

The aqueous alumina dispersions or suspensions which may be implemented are, in particular, the aqueous suspensions or dispersions of fine or ultrafine boehmites which are composed of particles advantageously having dimensions in the colloidal range.

The fine or ultrafine boehmites advantageously implemented in accordance with the present invention may, in particular, have been obtained in accordance with French patent FR-B-1 261 182 and FR-B-1 381 282 or in European patent application EP-A-15 196.

It is also possible advantageously to implement aqueous suspensions or dispersions obtained from pseudoboehmite, amorphous alumina gels, aluminium hydroxide or ultrafine hydrargillite gels.

Aluminium monohydrate can advantageously be bought from a variety of commercial sources of alumina such as, in particular, PURAL®, CATAPAL®, DISPERSAL®, DISPAL® sold by the company SASOL or else HIQ® sold by ALCOA, or using the methods known to a person skilled in the art: it can advantageously be prepared by partial dehydration of aluminium trihydrate using conventional methods or it can advantageously be prepared by precipitation. When these aluminas are in the form of a gel, they are advantageously peptised by water or an acidulated solution. In precipitation, the acid source may for example advantageously be selected from at least one of the following compounds: aluminium chloride, aluminium sulphate, aluminium nitrate. The basic aluminium source can be selected from basic aluminium salts such as sodium aluminate and potassium aluminate.

d) Preparing the IZM-2 Substrate/Binder

The substrate of the catalyst used in the process according to the invention can advantageously be prepared, using all the methods well known to a person skilled in the art, from the substrates prepared as described hereinbefore. Said crystallised IZM-2 solid can advantageously be introduced using any method known to a person skilled in the art, at any stage of the preparation of the substrate or the catalyst.

According to a preferred mode of preparation, said crystallised IZM-2 solid can advantageously be introduced over the course of the dissolving or while suspending the alumina compounds advantageously used in accordance with the invention. Said crystallised IZM-2 solid may be, without thereby entailing any limitation, for example in the form of a powder, ground powder, suspension, suspension having undergone a deagglomeration treatment. Thus, for example, said crystallised solid can advantageously be placed in an acidulated or non-acidulated solution at a concentration adjusted to the final IZM-2 solid content aimed at on the substrate. This suspension, which is commonly called a slip, is then mixed with the alumina compounds.

Shaping

The substrate of the catalyst used in the process according to the invention can advantageously be shaped by any procedure known to a person skilled in the art. The shaping can advantageously be carried out for example by extrusion, by pelletising, by the ("oil-drop") drop coagulation method, by granulation on a turntable or by any other method well known to a person skilled in the art.

The shaping can advantageously also be carried out in the presence of the various constituents of the catalyst and by extruding the inorganic paste obtained, by pelletising, shaping in the form of balls on a revolving plate or on a drum, ("oil-drop", "oil-up") drop coagulation, or any other known process for agglomerating a powder containing alumina and optionally other ingredients selected from those mentioned hereinbefore.

The catalysts implemented in the process according to the invention are in the form of spheres or extrudates. It is however advantageous for the catalyst to be in the form of extrudates having a diameter of between 0.5 and 5 mm and more specifically between 0.7 and 2.5 mm. The shapes are cylindrical (which may be hollow or non-hollow), twisted cylindrical, multilobed (2, 3, 4 or 5 lobes for example), annular. The cylindrical shape is advantageously used in a preferred manner, although any other shape can advantageously be used.

Moreover, these substrates implemented in the process according to the invention can advantageously have been treated, as is well known to a person skilled in the art, with additives to facilitate shaping and/or improve the final mechanical properties of the substrates. Examples of additives include, in particular, cellulose, carboxymethylcellulose, carboxyethylcellulose, tall oil, xanthan gums, surface active agents, flocculating agents such as polyacrylamides, carbon black, starches, stearic acid, polyacrylic alcohol, polyvinyl alcohol, biopolymers, glucose, polyethylene glycols, etc.

Water can advantageously be added or removed in order to adjust the viscosity of the paste to be extruded. This step can advantageously be carried out at any stage of the kneading step.

In order to adjust the solid matter content of the paste to be extruded in order to make it extrudable, it is also possible advantageously to add a mostly solid compound and preferably an oxide or a hydrate. Use is made preferably of a hydrate and even more preferably of an aluminium hydrate. The melting loss of this hydrate is advantageously greater than 15%.

The extrusion can advantageously be carried out using any conventional, commercially available tool. The paste obtained by kneading is advantageously extruded through a die, for example with the aid of a piston or a single or twin extrusion screw. This extrusion step can advantageously be carried out using any method known to a person skilled in the art.

The substrate extrudates according to the invention advantageously have generally a crushing strength of at least 70 N/cm and preferably greater than or equal to 100 N/cm.

Heat Treatment of the IZM-2 Substrate/Binder

Drying is advantageously carried out using any procedure known to a person skilled in the art.

In order to obtain the substrate of the present invention, it is preferable to carry out calcining preferably in the presence of molecular oxygen, for example by carrying out air sweeping, at a temperature of lower than or equal to 1,100° C. At least one calcination can advantageously be carried out after any one of the steps of the preparation. This treatment can for example be carried out in a passed-through bed, in a licked bed or in a static atmosphere. For example, the furnace used may advantageously be a revolving rotary furnace or be a vertical furnace with radial passed-through layers. The calcining conditions: the temperature and duration depend mainly on the maximum operating temperature of the catalyst. The preferred calcining conditions are advantageously between more than one hour at 200° C. and less than one hour at 1,100° C. The calcining can advantageously be operated in the presence of water vapour. The final calcining can optionally be carried out in the presence of an acid or basic vapour. For example, the calcining can advantageously be carried out under partial ammonia pressure.

Post-Synthesis Treatments of the IZM-2 Substrate/Binder

Post-synthesis treatments can advantageously be carried out so as to improve the properties of the catalyst.

The IZM-2 substrate/binder can thus be optionally subjected to a hydrothermal treatment in a confined atmosphere. The term "hydrothermal treatment in a confined atmosphere" refers to a treatment by passing through an autoclave in the presence of water at a temperature higher than ambient temperature.

Over the course of this hydrothermal treatment, the substrate can advantageously be treated. Thus, it is advantageously possible to impregnate the substrate, before it passes through an autoclave, the autoclaving being carried out either in the vapour phase or in the liquid phase, wherein this vapour or liquid phase of the autoclave may be acidic or non-acidic. This impregnating, prior to the autoclaving, may advantageously be acidic or non-acidic. This impregnating, prior to the autoclaving, can advantageously be carried out dry or by immersion of the substrate into an acidic aqueous solution. The term "dry impregnating" refers to the contacting of the substrate with a volume of solution less than or equal to the total porous volume of the substrate. Preferably, the impregnating is carried out dry.

The autoclave is preferably a rotatory basket autoclave such as that defined in patent application EP-A-0 387 109.

The temperature during autoclaving may be between 100 and 250° C. over a period of time of between 30 minutes and 3 hours.

e) Depositing of the Hydro-Dehydrogenating Function

The hydro-dehydrogenating function can advantageously be introduced at any stage of the preparation, very preferably after shaping of the IZM-2 substrate/binder. The shaping is advantageously followed by calcining; the hydro-dehydrogenating function can also advantageously be introduced before or after this calcining. The preparation is generally ended by calcining at a temperature of from 250 to 600° C. Another of the preferred methods according to the present invention consists advantageously in shaping the IZM-2 substrate/binder after kneading thereof, then passing the paste thus obtained through a die in order to shape extrudates having a diameter of between 0.4 and 4 mm. The hydro-dehydrogenating function can advantageously then be introduced merely in part or in its entirety, at the time of the kneading. It can also advantageously be introduced by way of one or more ion exchange operations on the calcined substrate.

Preferably, the substrate is impregnated by an aqueous solution. The substrate is preferably impregnated using what is known as the "dry" impregnating method well known to a person skilled in the art. The impregnating can advantageously be carried out in a single step by a solution containing all of the constituent elements of the final catalyst.

The hydro-dehydrogenating function can advantageously be introduced by way of one or more operations for impregnating the shaped and calcined substrate by a solution containing at least one precursor of at least one oxide of at least one metal selected from the group formed by the group VIII metals and the group VIB metals, the precursor(s) of at least one oxide of at least one group VIII metal being preferably introduced after the group VIB metals or at the same time as the latter, if the catalyst contains at least one group VIB metal and at least one group VIII metal.

If the catalyst contains advantageously at least one group VIB element, for example molybdenum, it is for example possible to impregnate the catalyst with a solution containing at least one group VIB element, to carry out drying, to carry out calcining. The impregnating of the molybdenum can advantageously be facilitated by adding phosphoric acid to the ammonium paramolybdate solutions, allowing phosphorus also to be introduced so as to promote catalytic activity.

The following elements: boron and/or silicon and/or phosphorus can be introduced into the catalyst at any level of the preparation and using any procedure known to a person skilled in the art.

A preferred method according to the invention consists in depositing the selected promoter element or elements, for example the boron/silicon pairing, on the IZM-2 substrate shaped with the calcined or non-calcined, preferably calcined binder. For that purpose, an aqueous solution of at least one boron salt, such as ammonium biborate or ammonium pentaborate, is prepared in an alkaline medium and in the presence of hydrogen peroxide and what is known as dry impregnating is carried out, in which the volume of the pores of the precursor is filled by the solution containing, for example, boron. If, for example, silicon is also deposited, use is made, for example, of a solution of a silicone or silicone oil emulsion-type silicon compound.

The promoter element(s) selected from the group formed by silicon, boron and phosphorus can advantageously be introduced by one or more operations for impregnating with excess solution on the calcined precursor.

The boron source may advantageously be boric acid, preferably orthoboric acid $H_3BO_3$, ammonium biborate or pentaborate, boron oxide, boric esters. The boron can for example be introduced in the form of a mixture of boric acid, hydrogen peroxide and a basic organic compound containing nitrogen such as ammonia, primary and secondary amines, cyclic amines, compounds of the pyridine family and quinolines and compounds of the pyrrole family. The boron can be introduced for example by way of a boric acid solution in a water/alcohol mixture.

The preferred phosphorus source is orthophosphoric acid $H_3PO_4$, although its salts and esters, such as ammonium phosphates, are also suitable. The phosphorus can for example be introduced in the form of a mixture of phosphoric acid and a basic organic compound containing nitrogen such as ammonia, primary and secondary amines, cyclic amines, compounds of the pyridine family and quinolines and compounds of the pyrrole family.

A large number of silicon sources can advantageously be employed. Thus, ethyl orthosilicate $Si(OEt)_4$, siloxanes, polysiloxanes, silicones, silicone emulsions, halide silicates such as ammonium fluorosilicate $(NH_4)_2SiF_6$ or sodium fluorosilicate $Na_2SiF_6$ can be used. Silicomolybdic acid and its salts, silicotungstic acid and its salts can also be advantageously employed. The silicon can advantageously be added, for example, by impregnation of ethyl silicate dissolved in a water/alcohol mixture. The silicon can be added, for example, by impregnating a silicone or silicic acid-type silicon compound suspended in water.

Group VIII noble metals of the catalyst of the present invention can advantageously be present entirely or partially in metallic and/or oxide form.

The sources of group VIII noble elements which can advantageously be used are well known to a person skilled in the art. The noble metals used are halides, for example chlorides, nitrates, acids such as chloroplatinic acid, hydroxides, oxychlorides such as ruthenium ammoniacal oxychloride. Cationic complexes, such as ammonium salts, can also advantageously be used when platinum is to be deposited on the IZM-2 solid by way of cation exchange.

The Embodiments According to the Invention

According to the present invention, the process for producing middle distillates from a paraffinic feedstock produced by Fischer-Tropsch synthesis implements a hydrocracking/hydroisomerisation catalyst comprising at least one hydro-dehydrogenating metal selected from the group formed by the metals from group VIB and from group VIII of the periodic table and a substrate comprising at least one crystallised IZM-2 solid.

Said process operates advantageously at a temperature of between 270 and 400° C. and preferably between 300 and 390° C., at a pressure of between 1 and 9 MPa and preferably between 2 and 8 MPa, at a space velocity of between 0.5 and 5 $h^{-1}$ and preferably between 0.8 and 3 $h^{-1}$, and at a hydrogen flow rate adjusted to obtain a ratio of from 400 to 1,500 normal liters of hydrogen per liter of feedstock and preferably a ratio of between 600 and 1,300 normal liters of hydrogen per liter of feedstock.

a) First Embodiment

According to a preferred embodiment of the invention, the process includes the following steps starting from a feedstock obtained by Fischer-Tropsch synthesis:
a) separating a single fraction, known as the heavy fraction, having an initial boiling point of between 120-200° C.,
b) hydrotreating at least a portion of said heavy fraction,
c) fractionation into at least 3 fractions:
    at least one intermediate fraction having an initial boiling point T1 of between 120 and 200° C., and a final boiling point T2 of higher than 300° C. and lower than 410° C., at least one light fraction boiling below the intermediate fraction,
    at least one heavy fraction boiling above the intermediate fraction;
d) passing at least a portion of said intermediate fraction over a hydroisomerising catalyst,
e) passing at least a portion of said heavy fraction in the process according to the invention,
f) distilling the hydrocracked/hydroisomerised fractions to obtain middle distillates, and recycling the residual fraction boiling above said middle distillates in step (e) on the catalyst according to the invention treating the heavy fraction.

This embodiment will be described with reference to FIG. 1 without FIG. 1 restricting interpretation.

Figure 5:
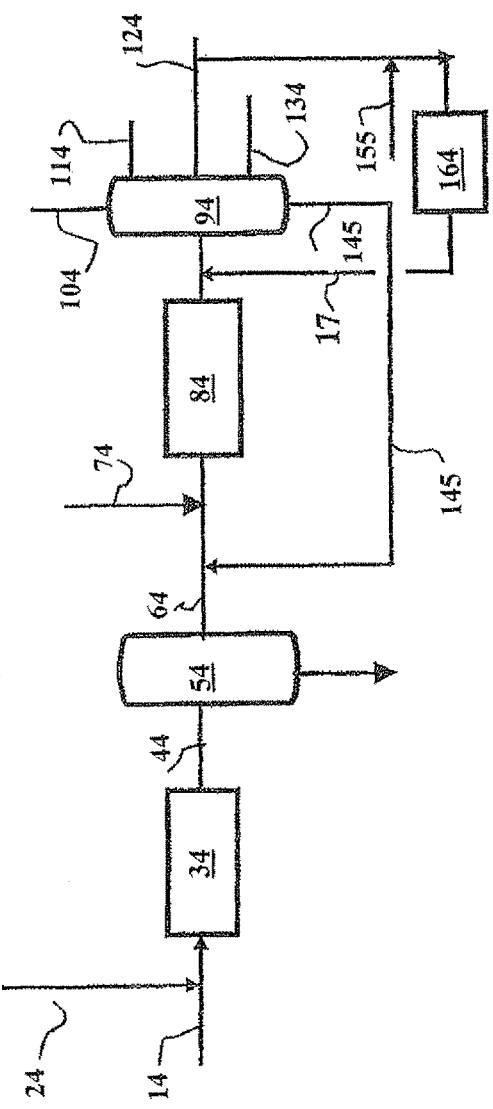

FIG. 5 is a schematic representation of an embodiment of the invention.

Step (a)

The effluent obtained from the Fischer-Tropsch synthesis unit and arriving through the conduit 1 is fractionated (for example by distillation) in a separating means (2) into at least two fractions: at least one light fraction and a heavy fraction having an initial boiling point equal to a temperature of between 120 and 200° C. and preferably between 130 and 180° C. and even more preferably at a temperature of about 150° C.; in other words, the cut point is between 120 and 200° C. The light fraction of FIG. 1 issues through the conduit (3) and the heavy fraction through the conduit (4).

This fractionation can be carried out using methods well known to a person skilled in the art such as flashing, distillation, etc. By way of non-limiting example, the effluent obtained from the Fischer-Tropsch synthesis unit will be subjected to flashing, decanting to eliminate the water and distillation in order to obtain at least the two fractions described hereinbefore.

The light fraction is not treated using the process of the invention but can, for example, constitute a good feedstock for petrochemistry and more specifically for a steam cracking unit (5). The heavy fraction described hereinbefore is treated using the process of the invention.

Step (b)

At least a portion of said heavy fraction (step a) is admitted, in the presence of hydrogen (conduit 6), into a zone (7) containing a hydrotreatment catalyst, the purpose of which is to reduce the olefinic and unsaturated compound content and also optionally to break down the oxygen-containing compounds present in the fraction, as well as optionally to break down any possible traces of sulphur-containing and nitrogen-containing compounds present in the heavy fraction. This hydrotreatment step is non-converting, that is to say, the conversion of the 370° C.$^+$ fraction into the 370° C.$^-$ fraction is preferably less than 20% by weight, preferably less than 10% by weight and very preferably less than 5% by weight.

The catalysts used in this step (b) are non-cracking or low-cracking hydrotreatment catalysts comprising at least one metal from group VIII and/or from group VI of the periodic table of the elements. Preferably, the catalyst comprises at least one metal from the group of metals formed by nickel, molybdenum, tungsten, cobalt, ruthenium, indium, palladium and platinum and comprises at least one substrate.

A combination of at least one metal from group VI (in particular molybdenum or tungsten) and at least one metal from group VIII (in particular cobalt and nickel) of the periodic table of the elements can be used. The concentration of group VIII non-noble metal, when such a metal is used, is from 0.01 to 15% by equivalent weight relative to the finished catalyst and that of the group VI metal (in particular molybdenum or tungsten) is from 5% to 30% by oxide equivalent weight relative to the finished catalyst. When a combination of group VI and group VIII metals is used, the catalyst is then preferably used in a sulphided form.

Advantageously, at least one element selected from P, B, Si is deposited on the substrate.

This catalyst will be able to contain advantageously phosphorus; indeed, this compound provides hydrotreatment catalysts with two advantages: ease of preparation during, in particular, the impregnation of nickel and molybdenum solutions and better hydrogenating activity.

In a preferred catalyst, the total concentration of group VI and VIII metals, expressed in metal oxides, is between 5 and 40% by weight and preferably between 7 and 30% by weight and the ratio by weight, expressed in group VI metal oxide (or metal oxides) to group VIII metal (or metals), is between 1.25 and 20 and preferably between 2 and 10. Advantageously, if there is phosphorus, the phosphorus oxide $P_2O_5$ concentration will be less than 15% by weight and preferably less than 10% by weight.

A catalyst containing boron and phosphorus can also be used; advantageously, boron and phosphorus are promoter elements deposited on the substrate, and for example the catalyst according to patent EP 297 949. The sum of the quantities of boron and phosphorus, expressed respectively in weight of boron trioxide and phosphorus pentoxide, relative to the weight of the substrate, is about 5 to 15% and the boron-to-phosphorus atomic ratio is about 1:1 to 2:1 and at least 40% of the total porous volume of the finished catalyst is contained in pores having an average diameter greater than 13 nanometers. Preferably, the quantity of group VI metal, such as molybdenum or tungsten, is such that the phosphorus-to-group VIB metal ratio is about 0.5:1 to 1.5:1; the quantities of group VIB metal and of group VIII metal, such as nickel or cobalt, are such that the group VIII metal-to-group VIB metal ratio is about 0.3:1 to 0.7:1. The quantity of group VIB metal, expressed in metal weight relative to the finished catalyst weight, is about 2 to 30% and the quantity of group VIII metal, expressed in metal weight relative to the finished catalyst weight, is about 0.01 to 15%.

Another particularly advantageous catalyst contains promoter silicon deposited on the substrate. An interesting catalyst contains BSi or PSi.

Ni on alumina, NiMo on alumina, NiMo on alumina doped with boron and phosphorus and NiMo on silica-alumina sulphided catalysts are also preferred. Advantageously, eta or gamma alumina will be selected as the substrate.

If preferred noble metals (platinum and/or palladium) are employed, the metal content is between 0.05 and 3% by weight relative to the finished catalyst and preferably between 0.1 and 2% by weight of the finished catalyst. The noble metal is preferably used in its reduced and non-sulphided form. It is also possible to employ a catalyst based on reduced and non-sulphided nickel. In this case, the content of metal in its oxide form is between 0.5 and 25% by weight relative to the finished catalyst. Preferably, the catalyst also contains a group IB metal such as copper, in proportions such that the ratio by mass of the group IB metal and the nickel to the catalyst is between 1 and 1:30.

These metals are deposited on a substrate which is preferably an alumina, but which may also be boron oxide, magnesia, zirconia, titanium oxide, a clay or a combination of these oxides. These catalysts can be prepared using all the methods known to a person skilled in the art or else be purchased from companies specialising in the manufacture and the sale of catalysts.

In the hydrotreatment reactor (7), the feedstock is contacted with the catalyst in the presence of hydrogen at operating temperatures and pressures allowing the olefins present in the feedstock to be hydrogenated. Preferably, the catalyst and the operating conditions selected will also allow hydrodeoxygenation to be carried out, i.e. breaking-down of the oxygen-containing compounds (mainly alcohols), and/or hydrodesulphurisation or hydrodeazotation of any possible traces of sulphur-containing and/or nitrogen-containing compounds present in the feedstock. The reaction temperatures used in the hydrotreatment reactor are between 100 and 400° C., preferably between 150 and 350° C., even more preferably between 150 and 300° C. The total pressure range used varies from 5 to 150 bar, preferably between 10 and 100 bar and even more preferably between 10 and 90 bar. The hydrogen which feeds the hydrotreatment reactor is introduced at a flow rate such that the hydrogen/hydrocarbon ratio by volume is between 50 and 3,000 normal liters per liter, preferably between 100 and 2,000 normal liters per liter and even more preferably between 150 and 1,500 normal liters per liter. The feedstock flow rate is such that the hourly volume velocity is between 0.1 and 10 $h^{-1}$, preferably between 0.2 and 5 $h^{-1}$ and even more preferably between 0.2 and 3 $h^{-1}$. Under these conditions, the content of unsaturated and oxygen-containing molecules is reduced to less than 0.5% by weight and to about less than 0.1% by weight in general. The hydrotreatment step is conducted under conditions such that the conversion of products having boiling points of higher than or equal to 370° C. into products having boiling points of lower than 370° C. is limited to 20% by weight, preferably is less than 10% by weight and even more preferably is less than 5% by weight.

Step (c)

The effluent obtained from the hydrotreatment reactor is conveyed through a conduit (8) into a fractionation zone (9) where it is fractionated into at least three fractions:

at least one light fraction (issuing through the conduit 10), the constituent components of which have boiling points of lower than a temperature T1 of between 120 and 200° C., and preferably between 130 and 180° C. and even more preferably at a temperature of about 150° C. In other words, the cut point is between 120 and 200° C.;

at least one intermediate fraction (conduit 11) comprising the compounds, the boiling points of which are between the cut point T1, defined hereinbefore, and a temperature T2 of higher than 300° C., even more preferably higher than 350° C. and lower than 410° C. or, better, than 370° C.;

at least one fraction, known as the heavy fraction (conduit 12), comprising the compounds having boiling points of higher than the cut point T2 defined hereinbefore.

Step (d)

At least a portion of said intermediate fraction is then introduced (conduit 11), as is optionally a stream of hydrogen (conduit 13), into the zone (14) containing a hydroisomerisation catalyst.

The operating conditions under which this step (d) is carried out are as follows. The pressure is maintained between 2 and 150 bar and preferably between 5 and 100 bar and advantageously from 10 to 90 bar, the space velocity is between 0.1 $h^{-1}$ and 10 $h^{-1}$ and preferably between 0.2 and 7 $h^{-1}$ and advantageously between 0.5 and 5.0 $h^{-1}$. The hydrogen flow rate is adjusted to obtain a ratio of from 100 to 2,000 normal liters of hydrogen per liter of feedstock and preferably between 150 and 1,500 liters of hydrogen per liter of feedstock. The temperature used in this step is between 200 and 450° C. and preferably from 250° C. to 450° C., advantageously from 300 to 450° C., and even more advantageously higher than 320° C. or for example between 320 and 420° C.

Hydroisomerisation step (d) is advantageously conducted under conditions such that the conversion per pass of products having boiling points of higher than or equal to 150° C. into products having boiling points of lower than 150° C. is as low as possible, preferably less than 50%, even more preferably less than 30%, and very preferably less than 15% by weight, and provides middle distillates (gas oil and kerosene) having sufficiently good cold properties (pour and freezing point) to satisfy the specifications in force for this type of fuel.

Thus, this step (d) seeks to promote hydroisomerisation rather than hydrocracking. The catalysts used are of the bifunctional type, that is to say, they possess a hydro/dehydrogenating function and a hydroisomerising function. The hydro/dehydrogenating function is generally provided either by active noble metals (Pt and/or Pd) in their reduced form or by group VI non-noble metals (particularly molybdenum and tungsten) in combination with group VIII non-noble metals (particularly nickel and cobalt), used preferably in their sulphided form. The hydroisomerising function is performed by zeolite, halogenated alumina, pillared clay, heteropolyacid or sulphated zirconia-type acid solids. An alumina-type binder can also be used during the step of shaping the catalyst. The metallic function can be introduced on the catalyst by any method known to a person skilled in the art, such as for example cokneading, dry impregnation, impregnation by exchange.

If the hydroisomerisation catalyst comprises at least one group VIII noble metal, the noble metal content is advantageously between 0.01 and 5% by weight relative to the finished catalyst, preferably between 0.1 and 4% by weight and very preferably between 0.2 and 2% by weight. Prior to use in the reaction, the noble metal contained in the catalyst must be reduced. One of the preferred methods for conducting the reduction of the metal is the treatment under hydrogen at a temperature of between 150° C. and 650° C. and a total pressure of between 1 and 250 bar. For example, a reduction consists in a stage at 150° C. for two hours, then a rise in temperature to 450° C. at the rate of 1° C./min, then a two-hour stage at 450° C.; throughout this reduction step, the hydrogen flow rate is 1,000 normal liters of hydrogen/liter of catalyst and the total pressure is kept constant at 1 bar. It should also be noted that any ex-situ reduction method is suitable.

If the hydroisomerisation catalyst comprises at least one group VI metal combined with at least one group VIII non-noble metal, the group VI metal content of the hydroisomerisation catalyst is advantageously between, in oxide equivalent, 5 and 40% by weight relative to the finished catalyst, preferably between 10 and 35% by weight and very preferably between 15 and 30% by weight and the group VIII metal content of said catalyst is advantageously between, in oxide equivalent, 0.5 and 10% by weight relative to the finished catalyst, preferably between 1 and 8% by weight and very preferably between 1.5 and 6% by weight. Prior to use in the reaction, the group VI metals and group VIII non-noble metals must be sulphided. Any in-situ or ex-situ sulphiding method known to a person skilled in the art is suitable.

The metallic hydro/dehydrogenating function can advantageously be introduced on said catalyst by any method known to a person skilled in the art, such as for example cokneading, dry impregnation, impregnation by exchange.

According to hydroisomerisation step (d) of the process according to the invention, the hydroisomerisation catalyst comprises at least one molecular sieve, preferably at least one zeolite molecular sieve and even more preferably at least one 10 MR monodimensional zeolite molecular sieve as the hydroisomerising function.

Zeolite molecular sieve are defined in the classification "Atlas of Zeolite Structure Types", W. M. Meier, D. H. Olson and Ch. Baerlocher, 5$^{th}$ revised edition, 2001 Elsevier, to which the present application also refers. In this document, zeolites are classified in accordance with the size of their pore or channel openings.

10 MR monodimensional zeolite molecular sieves have pores or channels, the opening of which is defined by a ring with 10 oxygen atoms (10 opening MR). The channels of the zeolite molecular sieve having a 10 MR opening are advantageously non-interconnected monodimensional channels which open directly onto the exterior of said zeolite. 10 MR monodimensional zeolite molecular sieves present in said hydroisomerisation catalyst comprise advantageously silicon and at least one element T selected from the group formed by aluminium, iron, gallium, phosphorus and boron, preferably aluminium. The Si/Al ratios of the zeolites described hereinbefore are advantageously those obtained on synthesis or else obtained after post-synthesis deluminisation treatments well known to a person skilled in the art such as, by way of non-limiting example, hydrothermal treatments which may or may not be followed by acid attacks or else direct acid attacks by inorganic or organic acid solutions. They are, preferably, almost totally, in acid form, that is to say that the atomic ratio between the monovalent compensation cation (for example sodium) and the element T inserted into the crystalline network of the solid is advantageously less than 0.1, preferably less than 0.05 and very preferably less than 0.01. Thus, the zeolites entering the compensation of said selective hydroisomerisation catalyst are advantageously calcined and exchanged by at least one treatment by a solution of at least one ammonium salt in such a way as to obtain the ammonium form of the zeolites which, once calcined, lead to the acid form of said zeolites.

Said 10 MR monodimensional zeolite molecular sieve of said hydroisomerisation catalyst is advantageously selected from the zeolite molecular sieves of structural type TON (selected from ZSM-22 and NU-10, taken alone or in a mixture), FER (selected from ZSM-35 and ferrierite, taken alone or in a mixture), EUO (selected from EU-1 and ZSM-50, taken alone or in a mixture), SAPO-11 or ZBM-30 or ZSM-48 zeolite molecular sieves, taken alone or in a mixture. Preferably, said 10 MR monodimensional zeolite molecular sieve is selected from ZBM-30, NU-10 and ZSM-22 zeolite molecular sieves, taken alone or in a mixture. Very preferably, said 10 MR monodimensional zeolite molecular sieve is ZBM-30 synthesised with the organic structuring agent triethylenetetramine. Indeed, the use of said ZBM-30 produces much better results in terms of yield and activity than the other zeolites and in particular than ZSM-48.

The 10 MR monodimensional zeolite molecular sieve content is advantageously between 5 and 95% by weight, preferably between 10 and 90% by weight, more preferably between 15 and 85% by weight and very preferably between 20 and 80% by weight relative to the finished catalyst. The catalysts obtained are shaped in the form of grains of various shapes and sizes. They are used generally in the form of cylindrical or polylobed extrudates such as straight or twisted-shaped bilobed, trilobed, polylobed extrudates, but can also be manufactured and employed in the form of crushed powders, tablets, rings, balls, wheels. The shaping can be carried out using matrices other than alumina, such as for example magnesia, amorphous silica-aluminas, natural clays (kaolin, bentonite, sepiolite, attapulgite), silica, titanium oxide, boron oxide, zirconia, aluminium phosphates, titanium phosphates, zirconia phosphates, coal and mixtures thereof. Use is preferably made of matrices containing alumina, in all its forms known to a person skilled in the art, and even more preferably of aluminas, for example gamma alumina. Procedures other than extrusion, such as pelletising or sugar coating, can be used.

Step (e)

At least a portion of said heavy fraction is introduced via the line (12) into a zone (15) where it is contacted, in the presence of hydrogen (25), with a catalyst implemented in the process according to the present invention and under the operating conditions of the process of the present invention in order to produce a cut of middle distillates (kerosene+gas oil) displaying good cold properties.

The catalyst used in the zone (15) of step (e) to carry out the hydrocracking and hydroisomerisation reactions of the heavy fraction is the catalyst defined in the first part of the patent application. It should be noted that the catalysts implemented in the reactors (14) and (15) may be strictly identical or different (for example by varying the proportion and the nature of the acid solid in the catalyst, the nature of the binder or else the quantity and nature of the hydrogenating phase).

During this step (e), the fraction entering the reactor undergoes, on contact with the catalyst and in the presence of hydrogen, basically hydrocracking reactions which, accompanied by hydroisomerisation reactions of n-paraffins, will allow the quality of the products formed and, more specifically, the cold properties of kerosene and gas oil to be improved, and also very good yields of middle distillates to be obtained. The conversion of products having boiling points of higher than or equal to 370° C. into products having boiling points of lower than 370° C. is greater than 50% by weight, often at least 60% by weight and preferably greater than or equal to 70%.

Step (f)

The effluents leaving the reactors (14) and (15) are sent through the conduits (16) and (17) in a distillation train which integrates atmospheric distillation and optionally distillation under vacuum, and the purpose of which is to separate, on the one hand, the light products which are inevitably formed during steps (d) and (e), for example the gases ($C_1$-$C_4$) (conduit 18) and a petrol cut (conduit 19), and to distil at least one gas oil (conduit 21) and kerosene (conduit 20) cut. The gas oil and kerosene fractions can be partially recycled (conduit 23), jointly or separately, at the head of the hydroisomerisation reactor (14) of step (d).

A fraction (conduit 22) boiling above gas oil, i.e. of which the compounds which form it have boiling points higher than those of the middle distillates (kerosene+gas oil), is also distilled. This fraction, known as the residual fraction, generally has an initial boiling point of at least 350° C., preferably higher than 370° C. This fraction is advantageously recycled via the conduit (22) at the head of the hydroisomerisation and hydrocracking reactor (15) of the heavy fraction (step e).

It may also be advantageous to recycle a portion of the kerosene and/or the gas oil in step (d), step (e) or both. Preferably, at least one of the kerosene and/or gas oil fractions is partially recycled in step (d) (zone 4). It has been found that it is advantageous to recycle a portion of the kerosene in order to improve its cold properties.

Advantageously and at the same time, the non-hydrocracked fraction is partially recycled in step (e) (zone 15).

It goes without saying that the gas oil and kerosene cuts are preferably recovered separately, but the cut points are adjusted by the operator as he sees fit.

Figure 1:
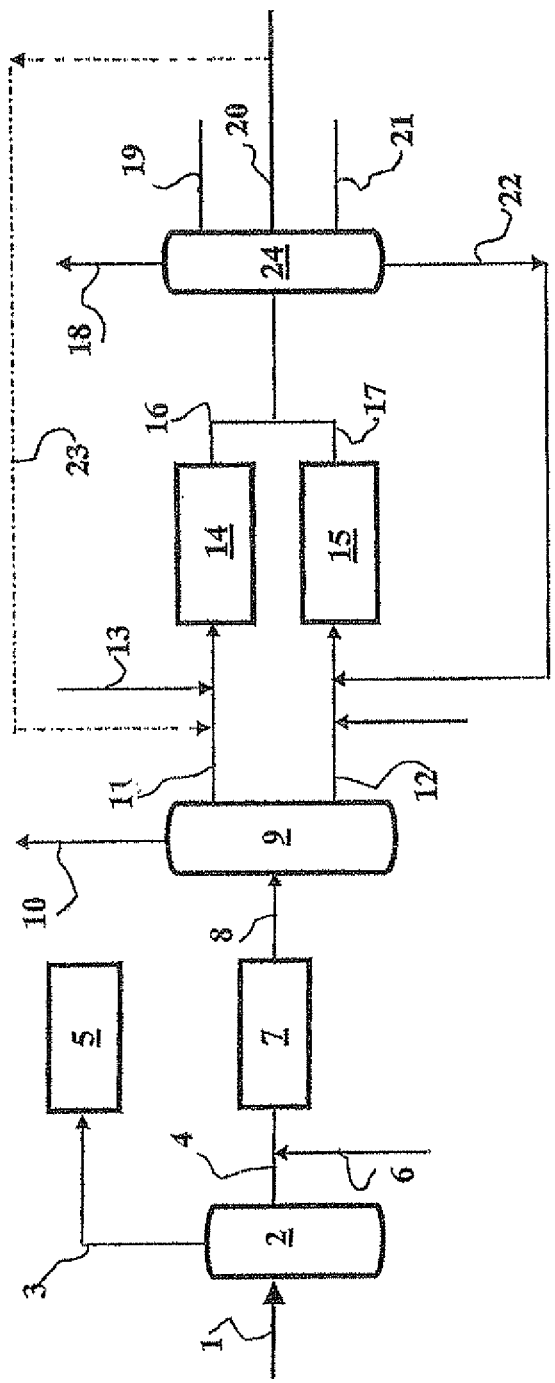
FIG. 1-4 schematically represent various embodiments of the invention.

FIG. 1 shows one distillation column (24), but two columns can be used to treat separately the cuts obtained from zones (14) and (15).

FIG. 1 shows only the recycling of the kerosene on the catalyst of the reactor (14). It goes without saying that it is equally possible to recycle a portion of the gas oil (separately or with the kerosene) and preferably on the same catalyst as the kerosene.

b) Second Embodiment

Another embodiment of the invention includes the following steps:

a) separating at least one light fraction of the feedstock so as to obtain a single fraction, known as the heavy fraction, having an initial boiling point of between 120-200° C., b) optionally hydrotreating said heavy fraction, optionally followed by a step c) for removing at least a portion of the water and optionally CO, $CO_2$, $NH_3$, $H_2S$, d) passing in the process according to the invention at least a portion of said optionally hydrotreated fraction, the conversion on the catalyst according to the invention described hereinbefore of the products having boiling points of higher than or equal to 370° C. into products having boiling points of lower than 370° C. is greater than 40% by weight, e) distilling the hydrocracked/hydroisomerised fraction to obtain middle distillates, and recycling in step d) the residual fraction boiling above said middle distillates.

Figure 2:
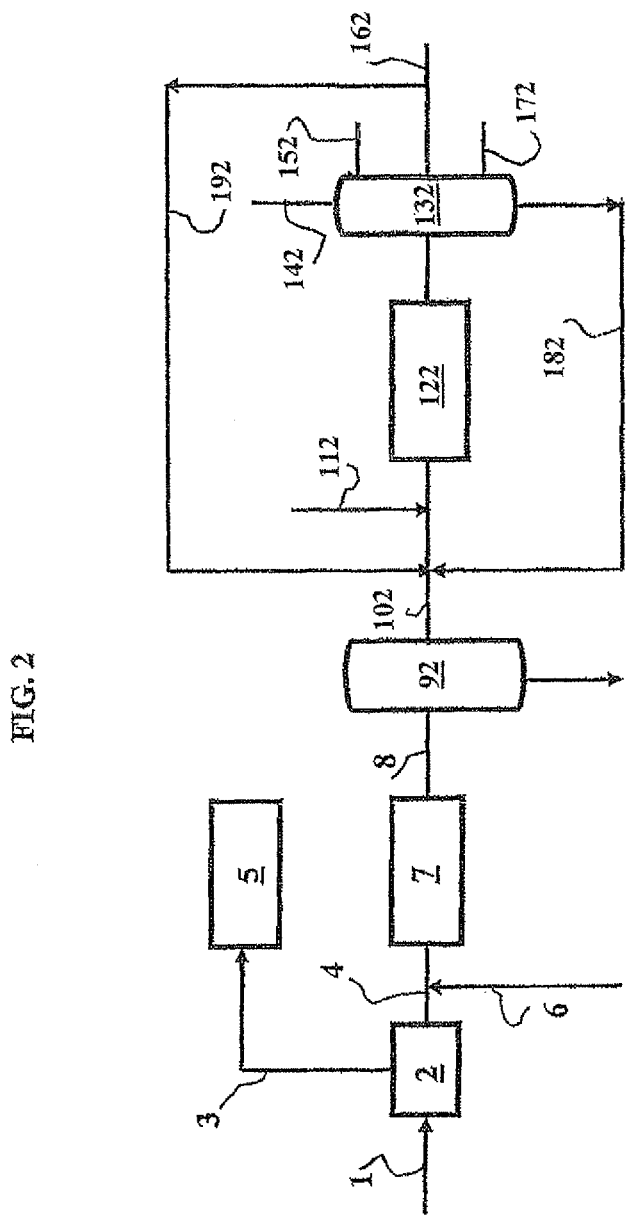

This embodiment will be described with reference to FIG. 2 without FIG. 2 restricting interpretation.

Step (a)

The effluent obtained from the Fischer-Tropsch synthesis unit and arriving through the conduit 12 is fractionated (for example by distillation) in a separating means (22) into at least two fractions: at least one light fraction and a heavy fraction having an initial boiling point equal to a temperature of between 120 and 200° C. and preferably between 130 and 180° C. and even more preferably at a temperature of about 150° C.; in other words, the cut point is between 120 and 200° C. The light fraction of FIG. 1 issues through the conduit (32) and the heavy fraction through the conduit (42).

This fractionation can be carried out using methods well known to a person skilled in the art such as flashing, distillation, etc. By way of non-limiting example, the effluent obtained from the Fischer-Tropsch synthesis unit will be subjected to flashing, decanting to eliminate the water and distillation in order to obtain at least the two fractions described hereinbefore.

The light fraction is not treated using the process of the invention but can, for example, constitute a good feedstock for petrochemistry and more specifically for a steam cracking unit (52). The heavy fraction described hereinbefore is treated using the process of the invention.

Step (b)

Optionally, this fraction is admitted, in the presence of hydrogen (conduit 62), into a zone (72) containing a hydrotreatment catalyst, the purpose of which is to reduce the olefinic and unsaturated compound content and also optionally to break down the oxygen-containing compounds (mainly alcohols) present in the heavy fraction described hereinbefore, as well as optionally to break down any possible traces of sulphur-containing and nitrogen-containing compounds present in the heavy fraction. This hydrotreatment step is non-converting, that is to say, the conversion of the 370° C.$^+$ fraction into the 370° C.$^-$ fraction is preferably less than 20% by weight, preferably less than 10% by weight and very preferably less than 5% by weight.

The catalysts used in this step (b) are hydrotreatment catalyst described in step (b) of the first embodiment.

In the hydrotreatment reactor (72), the feedstock is contacted in the presence of hydrogen and the catalyst at operating temperatures and pressures allowing the olefins present in the feedstock to be hydrogenated. Preferably, the catalyst and the operating conditions selected will also allow hydrodeoxygenation to be carried out, i.e. breaking-down of the oxygen-containing compounds (mainly alcohols), and/or hydrodesulphurisation or hydrodeazotation of any possible traces of sulphur-containing and/or nitrogen-containing compounds present in the feedstock. The reaction temperatures used in the hydrotreatment reactor are between 100 and 400° C., preferably between 150 and 350° C., even more preferably between 150 and 300° C. The total pressure range used varies from 5 to 150 bar, preferably between 10 and 100 bar and even more preferably between 10 and 90 bar. The hydrogen which feeds the hydrotreatment reactor is introduced at a flow rate such that the hydrogen/hydrocarbon ratio by volume is between 50 and 3,000 normal liters per liter, preferably between 100 and 2,000 normal liters per liter and even more preferably between 150 and 1,500 normal liters per liter. The feedstock flow rate is such that the hourly volume velocity is between 0.1 and 10 h$^{-1}$, preferably between 0.2 and 5 h$^{-1}$ and even more preferably between 0.2 and 3 h$^{-1}$. Under these conditions, the content of unsaturated and oxygen-containing molecules is reduced to less than 0.5% by weight and to about less than 0.1% by weight in general. The hydrotreatment step is conducted under conditions such that the conversion of products having boiling points of higher than or equal to 370° C. into products having boiling points of lower than 370° C. is limited to 20% by weight, preferably is less than 10% by weight and even more preferably is less than 5% by weight.

Step (c)

The effluent (conduit 82) obtained from the hydrotreatment reactor (72) is optionally introduced into a water removal zone (90), the purpose of which is to eliminate at least in part the water produced during the hydrotreatment reactions. This water can be eliminated with or without elimination of the gaseous fraction $C_4^-$ which is generally produced during the hydrotreatment step. The term "elimination of water" refers to the elimination of the water produced by the hydrodeoxygenation reactions of the oxygen-containing substances but may also include the elimination at least in part of the water of saturation of the hydrocarbons. The water can be eliminated using all the methods and procedures known to a person skilled in the art, for example by drying, passing over a desiccant, flashing, decanting, etc.

Step (d)

The (optionally hydrotreated) heavy fraction thus dried is then introduced (conduit 102), as is optionally a stream of hydrogen (conduit 112), into the zone (122) containing the catalyst implemented in the process according to the invention and under the operating conditions of the process of the present invention. Another eventuality of the process also according to the invention consists in sending all of the effluent issuing from the hydrotreatment reactor (without drying) into the reactor containing the catalyst according to the invention and preferably at the same time as a stream of hydrogen. The catalyst used for carrying out the hydrocracking and hydroisomerisation reactions of the heavy fraction is the catalyst defined in the first part of the patent application.

The operating conditions under which this step (d) is carried out are the operating conditions described in accordance with the process according to the invention.

The hydroisomerisation and hydrocracking step is conducted under conditions such that the conversion per pass of products having boiling points of higher than or equal to 370° C. into products having boiling points of lower than 370° C. is greater than 40% by weight, and even more preferably at least 50%, preferably greater than 60%, so as to obtain middle distillates (gas oil and kerosene) having sufficiently good cold properties (pour and freezing point) to satisfy the specifications in force for this type of fuel.

Step (e)

The effluent (what is known as the hydrocracked and hydroisomerised) effluent leaving the reactor (122), step (d), is sent in a distillation train (132) which integrates atmospheric distillation and optionally distillation under vacuum, and the purpose of which is to separate the conversion products having a boiling point of lower than 340° C. and preferably lower than 370° C. and including, in particular, those formed during step (d) in the reactor (122), and to separate the residual fraction, the initial boiling point of which is generally higher than at least 340° C. and preferably higher than or equal to at least 370° C. Of the conversion products, there are separated, apart from the light gases $C_1$-$C_4$ (conduit 142), at least one petrol fraction (conduit 152) and at least one kerosene (conduit 162) and gas oil (conduit 172) middle distillate fraction. The residual fraction, the initial boiling point of which is generally higher than at least 340° C. and preferably higher than or equal to at least 370° C., is recycled (conduit 182) at the head of the hydroisomerisation and hydrocracking reactor (122).

It may also be advantageous to recycle (conduit 192) in step (d) (reactor 122) a portion of the kerosene and/or the gas oil thus obtained.

c) Third Embodiment

Another embodiment of the invention includes the following steps:

a) fractionating (step a) the feedstock into at least three fractions:
    at least one intermediate fraction having an initial boiling point T1 of between 120 and 200° C., and a final boiling point T2 of higher than 300° C. and lower than 410° C.,
    at least one light fraction boiling below the intermediate fraction,
    at least one heavy fraction boiling above the intermediate fraction;

b) hydrotreating (step b) at least a portion of said intermediate fraction, then passing (step d) in a treatment process at least a portion of the hydrotreated fraction over a hydroisomerising catalyst c) eliminating at least a portion of the water produced during the hydrotreatment reactions and optionally CO, $CO_2$, $NH_3$, $H_2S$, d) passing (step d) in the process according to the invention at least a portion of said heavy fraction with a conversion of the 370° C.$^+$ products into 370° C.$^-$ products of greater than 40% by weight;

e) and f) distilling (steps e and f) at least a portion of the hydrocracked/hydroisomerised fractions to obtain middle distillates.

This embodiment will be described with reference to FIG. 3 without FIG. 3 restricting interpretation.

Step (a)

The effluent obtained from the Fischer-Tropsch synthesis unit mostly comprises paraffins, but also contains olefins and oxygen-containing compounds such as alcohols. It also contains water, $CO_2$, CO and non-reacted hydrogen as well as light hydrocarbon compounds $C_1$ to $C_4$ in gas form, optionally even sulphur-containing or nitrogen-containing impurities. The effluent obtained from the Fischer-Tropsch synthesis unit arriving through the conduit (13) is fractionated in a fractionation zone (23) into at least three fractions:

at least one light fraction (issuing through the conduit 33), the constituent components of which have boiling points of lower than a temperature T1 of between 120 and 200° C., and preferably between 130 and 180° C. and even more preferably at a temperature of about 150° C. In other words, the cut point is between 120 and 200° C., at least one intermediate fraction (conduit 43) comprising the compounds, the boiling points of which are between the cut point T1, defined hereinbefore, and a temperature T2 of higher than 300° C., even more preferably higher than 350° C. and lower than 410° C. or, better, than 370° C.;

at least one fraction, known as the heavy fraction (conduit 53), comprising the compounds having boiling points of higher than the cut point T2 defined hereinbefore.

The fact of cutting at 370° C. allows at least 90% by weight of the oxygen-containing substances and the olefins, and most often at least 95% by weight, to be separated. The heavy cut to be treated is then purified and elimination of the heteroatoms or unsaturated substances by hydrotreatment is then not necessary.

The fractionation is obtained in this case by distillation, but it can be carried out in one or more steps and by means other than distillation.

This fractionation can be carried out using methods well known to a person skilled in the art such as flashing, distillation, etc. By way of non-limiting example, the effluent obtained from the Fischer-Tropsch synthesis unit will be subjected to flashing, decanting to eliminate the water and distillation in order to obtain at least the three fractions described hereinbefore.

The light fraction is not treated using the process of the invention but can, for example, constitute a good feedstock for petrochemistry and more specifically for a steam cracker (steam cracking installation 63).

The heavier fractions described hereinbefore are treated using the process of the invention.

Step (b)

Said intermediate fraction is admitted via the line (43), in the presence of hydrogen conveyed through the tubing (73), into a hydrotreatment zone (83) containing a hydrotreatment catalyst, the objective of which is to reduce the olefinic and unsaturated compound content and also optionally to break down the oxygen-containing compounds (mainly alcohols) present in the heavy fraction described hereinbefore, as well as optionally to break down any possible traces of sulphur-containing and nitrogen-containing compounds present in the heavy fraction. This hydrotreatment step is non-converting, that is to say, the conversion of the 150° C.$^+$ fraction into the 150° C.$^-$ fraction is preferably less than 20% by weight, preferably less than 10% by weight and very preferably less than 5% by weight.

The catalysts used in this step (b) are hydrotreatment catalysts described in step (b) of the first embodiment.

In the hydrotreatment reactor (83), the feedstock is contacted with the catalyst in the presence of hydrogen and at operating temperatures and pressures allowing the olefins present in the feedstock to be hydrogenated. Preferably, the catalyst and the operating conditions selected will also allow hydrodeoxygenation to be carried out, i.e. breaking-down of the oxygen-containing compounds (mainly alcohols), and/or hydrodesulphurisation or hydrodeazotation of any possible traces of sulphur-containing and/or nitrogen-containing compounds present in the feedstock. The reaction temperatures used in the hydrotreatment reactor are between 100 and 400° C., preferably between 150 and 350° C., even more preferably between 150 and 300° C. The total pressure range used varies from 5 to 150 bar, preferably between 10 and 100 bar and even more preferably between 10 and 90 bar. The hydrogen which feeds the hydrotreatment reactor is introduced at a flow rate such that the hydrogen/hydrocarbon ratio by volume is between 50 and 3,000 normal liters per liter, preferably between 100 and 2,000 normal liters per liter and even more preferably between 150 and 1,500 normal liters per liter. The feedstock flow rate is such that the hourly volume velocity is between 0.1 and 10 h$^{-1}$, preferably between 0.2 and 5 h$^{-1}$ and even more preferably between 0.2 and 3 h$^{-1}$. Under these conditions, the content of unsaturated and oxygen-containing molecules is reduced to less than 0.5% by weight and to about less than 0.1% by weight in general. The hydrotreatment step is conducted under conditions such that the conversion of products having boiling points of higher than or equal to 150° C. into products having boiling points of lower than 150° C. is limited to 20% by weight, preferably is less than 10% by weight and even more preferably is less than 5% by weight.

Step (c)

The effluent obtained from the hydrotreatment reactor is optionally introduced into a water removal zone (93), the purpose of which is to eliminate at least a portion of the water produced during the hydrotreatment reactions. This water can be eliminated with or without elimination of the gaseous fraction $C_4^-$ which is generally produced during the hydrotreatment step. The term "elimination of water" refers to the elimination of the water produced by the hydrodeoxygenation reactions of the oxygen-containing substances, but may also include the elimination at least in part of the water of saturation of the hydrocarbons. The water can be eliminated using all the methods and procedures known to a person skilled in the art, for example by drying, passing over a desiccant, flashing, decanting, etc.

Step (d)

The fraction thus optionally dried is then introduced (conduit 103), as is optionally a stream of hydrogen (conduit 113), into the zone (123) containing a hydroisomerising catalyst. Another eventuality of the process also according to the invention consists in sending all of the effluent issuing from the hydrotreatment reactor (without drying) into the reactor containing the hydroisomerising catalyst and preferably at the same time as a stream of hydrogen.

The hydroisomerising catalysts are as described in step (d) of the first embodiment.

The operating conditions under which this step (d) is carried out are as follows. The pressure is maintained between 2 and 150 bar and preferably between 5 and 100 bar and advantageously from 10 to 90 bar, the space velocity is between 0.1 h$^{-1}$ and 10 h$^{-1}$ and preferably between 0.2 and 7 h$^{-1}$ and advantageously between 0.5 and 5.0 h$^{-1}$. The hydrogen flow rate is adjusted to obtain a ratio of from 100 to 2,000 normal liters of hydrogen per liter of feedstock and preferably between 150 and 1,500 liters of hydrogen per liter of feedstock. The temperature used in this step is between 200 and 450° C. and preferably from 250° C. to 450° C., advantageously from 300 to 450° C., and even more advantageously higher than 320° C. or for example between 320 and 420° C.

Hydroisomerisation step (d) is advantageously conducted under conditions such that the conversion per pass of products having boiling points of higher than or equal to 150° C. into products having boiling points of lower than 150° C. is as low as possible, preferably less than 50%, even more preferably less than 30%, and provides middle distillates (gas oil and kerosene) having sufficiently good cold properties (pour and freezing point) to satisfy the specifications in force for this type of fuel.

Thus, this step (d) seeks to promote hydroisomerisation rather than hydrocracking.

Step (e)

Said heavy fraction, the boiling points of which are higher than the cut point T2 defined hereinbefore, is introduced via the line (52) into a zone (133) where it is contacted, in the presence of hydrogen (263), with a catalyst according to the invention and under the operating conditions of the process of the present invention in order to produce a cut of middle distillates (kerosene+gas oil) displaying good cold properties.

The catalyst used in the zone (133) of step (e) to carry out the hydrocracking and hydroisomerisation reactions of the heavy fraction is the catalyst defined in the first part of the patent application. It should be noted that the catalysts implemented in the reactors and (133) may be strictly identical or different (for example by varying the proportion and the nature of the acid solid in the catalyst, the nature of the binder or else the quantity and nature of the hydrogenating phase).

During this step (e), the fraction entering the reactor undergoes, on contact with the catalyst and in the presence of hydrogen, basically hydrocracking reactions which, accompanied by hydroisomerisation reactions of n-paraffins, will allow the quality of the products formed and, more specifically, the cold properties of kerosene and gas oil to be improved, and also very good yields of middle distillates to be obtained. The conversion of products having boiling points of higher than or equal to 370° C. into products having boiling points of lower than 370° C. is greater than 40% by weight, often at least 50% and preferably greater than or equal to 60%.

This step (e) will therefore seek to promote hydrocracking, but preferably while limiting cracking of the middle distillates.

The selection of the operating conditions allows fine adjustment of the quality of the products (gas oil, kerosene) and in particular the cold properties of kerosene, while preserving a good gas oil and/or kerosene yield. The process according to the invention allows in a very interesting manner the production of both kerosene and gas oil which are of good quality, while minimising the production of undesirable lighter cuts (naphtha, GPL).

Step (f)

The effluent leaving the reactor (123), step (d), is sent in a distillation train which integrates atmospheric distillation and optionally distillation under vacuum, and the purpose of which is to separate, on the one hand, the light products which are inevitably formed during step (d), for example the gases ($C_1$-$C_4$) (conduit 143) and a petrol cut (conduit 153), and to distil at least one gas oil (conduit 173) and kerosene (conduit 163) cut. The gas oil and kerosene fractions can be partially recycled (conduit 253), jointly or separately, at the head of the hydroisomerisation reactor (123) of step (d).

The effluent leaving at step (e) is subjected to a separation step in a distillation train in such a way as to separate, on the one hand, the light products which are inevitably formed during step (e), for example the gases ($C_1$-$C_4$) (conduit 183) and a petrol cut (conduit 193), to distil a gas oil (conduit 213) and kerosene (conduit 203) cut and to distil the fraction (conduit 223) boiling above gas oil, i.e. of which the compounds which form it have boiling points higher than those of the middle distillates (kerosene+gas oil). This fraction, known as the residual fraction, generally has an initial boiling point of at least 350° C., preferably higher than 370° C. This non-hydrocracked fraction is advantageously recycled at the head of the hydroisomerisation and hydrocracking reactor (133) of step (e).

It may also be advantageous to recycle a portion of the kerosene and/or the gas oil in step (d), step (f) or both. Preferably, at least one of the kerosene and/or gas oil fractions is partially recycled (conduit 253) in step (d) (zone 123). It has been found that it is advantageous to recycle a portion of the kerosene in order to improve its cold properties.

Advantageously and at the same time, the non-hydrocracked fraction is partially recycled in step (f) (zone 133).

It goes without saying that the gas oil and kerosene cuts are preferably recovered separately, but the cut points are adjusted by the operator as he sees fit.

Figure 3:
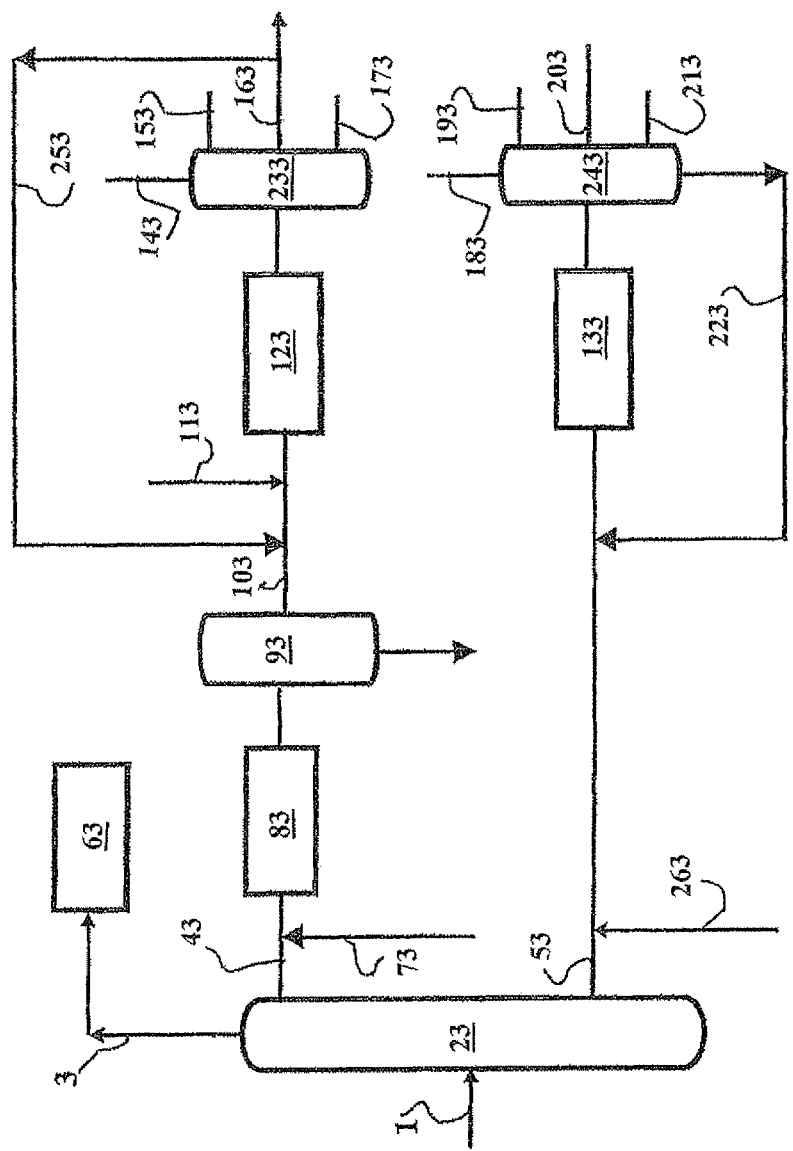

FIG. 3 shows two distillation columns (233) and (243), but a single column can be used to treat all the cuts obtained from zones (123) and (133).

FIG. 3 shows only the recycling of the kerosene on the catalyst of the reactor (123). It goes without saying that it is equally possible to recycle a portion of the gas oil (separately or with the kerosene) and preferably on the same catalyst as the kerosene. It is also possible to recycle a portion of the kerosene and/or the gas oil produced in the lines (203) and (213).

d) Fourth Embodiment

Another embodiment of the invention includes the following steps:

a) optionally fractionating the feedstock into at least one heavy fraction having an initial boiling point of between 120 and 200° C., and at least one light fraction boiling below said heavy fraction, b) optionally hydrotreating at least a portion of the feedstock or the heavy fraction, optionally followed by c) eliminating at least a portion of the water, d) passing at least a portion of the effluent or the fraction, optionally hydrotreated in the process according to the invention, over a first catalyst according to the invention, e) distilling the hydroisomerised and hydrocracked effluent to obtain middle distillates (kerosene, gas oil) and a residual fraction boiling above the middle distillates, f) passing at least a portion of said residual heavy fraction and/or a portion of said middle distillates in the process according to the invention over a second catalyst according to the invention, and distilling the resulting effluent to obtain middle distillates.

This embodiment will be described with reference to FIGS. 4 and 5, without these figures restricting interpretation.

Step (a)

When this step is implemented, the effluent obtained from the Fischer-Tropsch synthesis unit is fractionated (for example by distillation) into at least two fractions: at least one light fraction and a heavy fraction having an initial boiling point equal to a temperature of between 120 and 200° C. and preferably between 130 and 180° C. and even more preferably at a temperature of about 150° C.; in other words, the cut point is between 120 and 200° C.

The heavy fraction generally has paraffin contents of at least 50% by weight.

This fractionation can be carried out using methods well known to a person skilled in the art such as flashing, distillation, etc. By way of non-limiting example, the effluent obtained from the Fischer-Tropsch synthesis unit will be subjected to flashing, decanting to eliminate the water and distillation in order to obtain at least the two fractions described hereinbefore.

The light fraction is not treated using the process of the invention but can, for example, constitute a good feedstock for petrochemistry and more specifically for a steam cracking unit. At least one heavy fraction described hereinbefore is treated using the process of the invention.

Step (b)

Optionally, this fraction or at least a portion of the initial feedstock is admitted via the line (14), in the presence of hydrogen (conveyed through the conduit (24)), into a zone (34) containing a hydrotreatment catalyst, the objective of which is to reduce the olefinic and unsaturated compound content and also optionally to break down the oxygen-containing compounds (mainly alcohols) present in the heavy fraction described hereinbefore, as well as optionally to break down any possible traces of sulphur-containing and nitrogen-containing compounds present in the heavy fraction. This hydrotreatment step is non-converting, that is to say, the conversion of the 370° C.$^+$ fraction into the 370° C.$^-$ fraction is preferably less than 20% by weight, preferably less than 10% by weight and very preferably less than 5% by weight.

The catalysts used in this step (b) are described in step (b) of the first embodiment.

In the hydrotreatment reactor (34), the feedstock is contacted with the catalyst in the presence of hydrogen and at operating temperatures and pressures allowing the olefins present in the feedstock to be hydrogenated. Preferably, the catalyst and the operating conditions selected will also allow hydrodeoxygenation to be carried out, i.e. breaking-down of the oxygen-containing compounds (mainly alcohols), and/or hydrodesulphurisation or hydrodeazotation of any possible traces of sulphur-containing and/or nitrogen-containing compounds present in the feedstock. The reaction temperatures used in the hydrotreatment reactor are between 100 and 400° C., preferably between 150 and 350° C., even more preferably between 150 and 300° C. The total pressure range used varies from 5 to 150 bar, preferably between 10 and 100 bar and even more preferably between 10 and 90 bar. The hydrogen which feeds the hydrotreatment reactor is introduced at a flow rate such that the hydrogen/hydrocarbon ratio by volume is between 50 and 3,000 normal liters per liter, preferably between 100 and 2,000 normal liters per liter and even more preferably between 150 and 1,500 normal liters per liter. The feedstock flow rate is such that the hourly volume velocity is between 0.1 and 10 h$^{-1}$, preferably between 0.2 and 5 h$^{-1}$ and even more preferably between 0.2 and 3 h$^{-1}$. Under these conditions, the content of unsaturated and oxygen-containing molecules is reduced to less than 0.5% by weight and to about less than 0.1% by weight in general. The hydrotreatment step is conducted under conditions such that the conversion of products having boiling points of higher than or equal to 370° C. into products having boiling points of lower than 370° C. is limited to 20% by weight, preferably is less than 10% by weight and even more preferably is less than 5% by weight.

Step (c)

The effluent (conduit 44) obtained from the hydrotreatment reactor (34) is optionally introduced into a water removal zone (54), the purpose of which is to eliminate at least in part the water produced during the hydrotreatment reactions. This water can be eliminated with or without elimination of the gaseous fraction $C_4^-$ which is generally produced during the hydrotreatment step. The term "elimination of water" refers to the elimination of the water produced by the hydrodeoxygenation reactions of the oxygen-containing substances but may also include the elimination at least in part of the water of saturation of the hydrocarbons. The water can be eliminated using all the methods and procedures known to a person skilled in the art, for example by drying, passing over a desiccant, flashing, decanting, etc.

Step (d)

At least a portion and preferably all of the hydrocarbonated fraction (at least a portion of the feedstock or at least a portion of the heavy fraction of step a) or at least a portion of the hydrotreated and optionally dried fraction or feedstock) is then introduced (conduit 64), as is optionally a stream of hydrogen (conduit 74), into the zone (84) containing the catalyst according to the invention. Another eventuality of the process also according to the invention consists in sending a portion or all of the effluent issuing from the hydrotreatment reactor (without drying) into the reactor containing the catalyst according to the invention and preferably at the same time as a stream of hydrogen.

Prior to use in the reaction, if the hydrogenating phase of the catalyst consists of at least one noble metal, the metal contained in the catalyst must be reduced. One of the preferred methods for conducting the reduction of the metal is the treatment under hydrogen at a temperature of between 150° C. and 650° C. and a total pressure of between 1 and 250 bar. For example, a reduction consists in a stage at 150° C. for 2 hours, then a rise in temperature to 450° C. at the rate of 1° C./min, then a two-hour stage at 450° C.; throughout this reduction step, the hydrogen flow rate is 1,000 normal liters of hydrogen/liter of catalyst. It should also be noted that any ex-situ reduction method is suitable.

Step (e)

The hydroisomerised and hydrocracked effluent leaving the reactor (84), step (d), is sent in a distillation train (94) which integrates atmospheric distillation and optionally distillation under vacuum, and the purpose of which is to separate the conversion products having a boiling point of lower than 340° C. and preferably lower than 370° C. and including, in particular, those formed during step (d) in the reactor (84), and to separate the residual fraction, the initial boiling point of which is generally higher than at least 340° C. and preferably higher than or equal to at least 370° C. Of the hydroisomerised conversion products, there are separated, apart from the light gases $C_1$-$C_4$ (conduit 104), at least one petrol fraction (conduit 114) and at least one kerosene (conduit 124) and gas oil (conduit 134) middle distillate fraction.

Step (f)

The process according to the invention uses a second zone (164) containing a hydrocracking and hydroisomerisation catalyst described in the first part of the patent. There passes over this catalyst, in the presence of hydrogen (conduit 154), an effluent selected from a portion of the kerosene produced (conduit 124), a portion of the gas oil (conduit 134) and the residual fraction and preferably the residual fraction, the initial boiling point of which is generally higher than at least 370° C.

During this step, the fraction entering the reactor (164) undergoes, on contact with the catalyst and in the presence of hydrogen, hydroisomerisation and/or hydrocracking reactions which will allow the quality of the products formed and, more specifically, the cold properties of kerosene and gas oil to be improved, and yields of middle distillates improved over the prior art to be obtained.

The selection of the operating conditions allows fine adjustment of the quality of the products (middle distillates) and in particular the cold properties.

The operating conditions under which this step (f) is carried out are the operating conditions in accordance with the process according to the invention.

The operator will adjust the operating conditions on the first and second hydrocracking and hydroisomerisation catalyst in such a way as to obtain the desired product qualities and yields.

Thus, generally speaking, on the first catalyst, the conversion per pass of products having boiling points of higher than or equal to 150° C. into products having boiling points of lower than 150° C. is less than 50% by weight, preferably less than 30% by weight. These conditions allow the individual to adjust the ratio of kerosene/gas oil produced as well as the cold properties of the middle distillates, and more specifically of kerosene.

Also generally speaking, on the second catalyst, when the residual fraction is treated, the conversion per pass of products having boiling points of higher than or equal to 370° C. into products having boiling points of lower than 370° C. is greater than 40% by weight, preferably greater than 50% or, better, than 60%. It may even prove advantageous to have conversion rates of at least 80% by weight.

When a portion of the kerosene and/or the gas oil is treated on the second catalyst, the conversion per pass of products having boiling points of higher than or equal to 150° C. into products having boiling points of lower than 150° C. is less than 50% by weight, preferably less than 30%.

Generally speaking, the operating conditions applied in the reactors (84) and (164) may be different or identical. Preferably, the operating conditions used in the two hydroisomerisation and hydrocracking reactors are selected so as to be different in terms of operating pressure, temperature, hourly volume velocity and $H_2$/feedstock ratio. This embodiment allows the operator to adjust the kerosene and gas oil qualities and/or yields.

The effluent obtained from the reactor (164) is then sent via the line (174) in the distillation train in such a way as to separate the conversion products, petrol, kerosene and gas oil.

Figure 4:
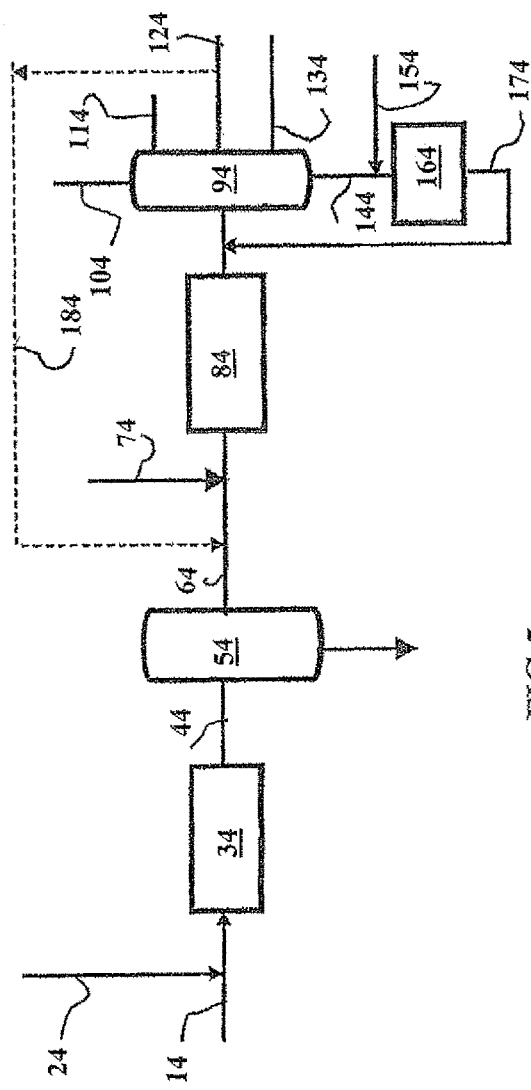

FIG. 4 shows an embodiment with the residual fraction (conduit 144) passing into the hydroisomerisation and hydrocracking zone (164) (step f), the effluent obtained being sent (conduit 174) into the separation zone (94).

Advantageously, at the same time, the kerosene and/or the gas oil can be partially recycled (conduit 184) in the hydroisomerisation and hydrocracking zone (84) (step d) on the first catalyst.

In FIG. 5, a portion of the kerosene and/or the gas oil produced passes into the hydroisomerisation and hydrocracking zone (164) (step f), the effluent obtained being sent (conduit 174) into the separation zone (94).

At the same time, the residual fraction (conduit 144) is recycled in the hydroisomerisation and hydrocracking zone (84) (step d) on the first catalyst.

It has been found that it is advantageous to recycle a portion of the kerosene on a hydrocracking and hydroisomerisation catalyst in order to improve its cold properties.

The figures show only the recycling of the kerosene. It goes without saying that it is equally possible to recycle a portion of the gas oil (separately or with the kerosene) and preferably on the same catalyst as the kerosene.

The invention is not limited to these four embodiments.

The Products Obtained

The gas oil(s) obtained has/have a pour point of at most 0° C., generally lower than −10° C. and often lower than −15° C. The cetane number is higher than 60, generally higher than 65, often higher than 70.

The kerosene(s) obtained has/have a freezing point of at most −35° C., generally lower than −40° C. The smoke point is greater than 25 mm, generally greater than 30 mm. In this process, (undesirable) petrol production is as low as possible. The yield of petrol will still be less than 50% by weight, preferably less than 40% by weight, advantageously less than 30% by weight or else than 20% by weight or even than 15% by weight.

Example 1

Preparation of the Hydrotreatment Catalyst (C1)

The catalyst is an industrial catalyst based on palladium-type noble metal on alumina with a palladium content of 0.3% by weight relative to the total weight of the finished catalyst, supplied by the company AXENS.

Example 2

Preparation of a Hydroisomerisation and Hydrocracking Catalyst According to the invention (C4)

a) Synthesis of a Crystallised IZM-2 Solid (C2)

Preparation of 1,6-bis(methylpiperidinium)hexane dibromide 50 grams of 1,6-dibromohexane (0.20 mole, 99%, Alfa Aesar) are added to a 1-1 flask containing 50 grams of N-methylpiperidine (0.51 mole, 99%, Alfa Aesar) and 200 ml of ethanol. The reaction medium is stirred and refluxed for 5 h. The mixture is subsequently cooled to ambient temperature, then filtered. The mixture is poured into 300 ml of cold diethyl ether, then the precipitate formed is filtered and washed with 100 ml of diethyl ether. The solid obtained is recrystallised in an ethanol/ether mixture. The solid obtained is dried under vacuum for 12 h. 71 grams of a white solid (i.e. a yield of 80%) are obtained. The product possesses the expected 1H NMR spectrum. 1H NMR ($D_2O$, ppm/TMS): 1.27 (4H, m); 1.48 (4H, m); 1.61 (4H, m); 1.70 (8H, m); 2.85 (6H, s); 3.16 (12H, m).

Preparation of an IZM-2 Solid According to the Invention (C2)

30 grams of a colloidal suspension of silica, known under the commercial term Ludox AS-40 sold by Aldrich, are incorporated into a solution composed of 0.158 grams of sodium aluminate (Carlo Erba), 2.433 grams of sodium hydroxide (Prolabo), 14.7333 grams of 1,6-bis(methylpiperidinium)hexane dibromide and 101.561 grams of deionised water. The molar composition of the mixture is as follows: $SiO_2$; 0.004 $Al_2O_3$; 0.17 $Na_2O$; 0.17 1,6-bis(methylpiperidinium)hexane; 33.33 $H_2O$. The mixture is stirred vigorously for half an hour. The mixture is then transferred, after homogenisation, to an autoclave. The autoclave is heated over 6 days to 170° C. while stirring (200 rpm). The crystallised product obtained is filtered, washed in deionised water (in order to attain a neutral pH), then dried overnight at 100° C. The solid is then introduced into a muffle furnace where the calcining is carried out: the calcining cycle includes a rise in temperature up to 200° C., a stage at 200° C. maintained for 2 hours, a rise in temperature up to 550° C., followed by a stage at 550° C. maintained for 8 hours, then a return to ambient temperature.

The calcined solid product was analysed by X-ray diffraction and identified as consisting of IZM-2 solid.

b) Preparation of the IZM-2 Substrate/Binder According to the Invention (C3)

An IZM-2 substrate/binder according to the invention is produced in the following manner: 7 grams of the IZM-2 solid (C1) are mixed with 43 grams of a matrix composed of ultrafine tabular boehmite or alumina gel sold under the name SB3 by the company Condéa Chemie GmbH. This powder mixture was then mixed with an aqueous solution containing 66% by weight of nitric acid (7% by weight of acid per gram of dry gel), then kneaded for 15 minutes. The kneaded paste is then extruded through a die having a diameter of 1.2 mm. The extrudates are then calcined at 500° C. (start ramp of 5° C./min) for 2 hours in a passed-through bed under dry air (1 l of air/h/gram of solid).

The extrudates thus calcined are exchanged three times on contact with an ammonium nitrate solution in order to obtain the IZM-2 solid in its acid form.

The 50 grams of extrudates are contacted with 400 ml of a 10N ammonium nitrate solution and the mixture is refluxed while stirring for 4 hours. The mixture is subsequently filtered, then the extrudates rinsed with 800 ml of distilled water and dried in a thin layer overnight in an oven at 150° C. This operation is carried out three times. After the third exchange, the extrudates are then calcined at 150° C. (start ramp of 5° C./min) for two hours in a passed-through bed under dry air (2 l of air/h/gram of solid). The content by weight of sodium measured by atomic adsorption on the exchanged and calcined extrudates is less than 50 ppm.

c) Deposition of the Hydro-Dehydrogenating Function (C4)

The IZM-2/binder extrudates (C2) are subjected to a step for dry impregnation by a hexachloroplatinic acid $H_2PtCl_6$ solution left to mature in a water maturator for 24 hours at ambient temperature, then calcined at 500° C. (start ramp of 5° C./min) for two hours in a passed-through bed under dry air (2 l of air/h/gram of solid). The platinum content by weight of the final catalyst after calcining is 0.80%. Its dispersion, measured by $H_2$—$O_2$ titration, is 85% and the coefficient of distribution of the platinum, measured by Castaing microprobe, is equal to 0.92.

Example 3

Treatment of a Feedstock Obtained by Fischer-Tropsch Synthesis in Accordance with the Second Embodiment of the Process According to the Invention A feedstock obtained by Fischer-Tropsch synthesis on a cobalt catalyst is separated into two fractions in a step a); the heavier fraction, displays the features provided in Table 1.

This heavy fraction is treated in a bed through which lost hydrogen passes on the hydrotreatment catalyst C1 under operating conditions allowing elimination of the olefinic and oxygen-containing compounds and also of the traces of nitrogen, in a step b). The operating conditions selected are as follows:

HVV (volume of feedstock/volume of catalyst/hour)=2 $h^{-1}$ total working pressure: 50 bar hydrogen/feedstock ratio: 200 normal liters/liter temperature: 270° C.

TABLE 1

| Features of the heavy fraction | |
|---|---|
| Simulated distillation | T (5% by weight): 175° C. |
|  | T (25% by weight): 246° C. |
|  | T (50% by weight): 346° C. |
|  | T (75% by weight): 444° C. |
|  | T (95% by weight): 570° C. |
| 370° C.$^+$ compounds (by GC) | 43% by weight |
| Density at 15° C. | 0.797 |
| Nitrogen content | 7 ppm |
| Sulphur content | <detection limit |
| Detailed analysis of the $C_{30}^-$ fraction (GC) | |
| n-paraffins | 82% by weight |
| i-paraffins | 6% by weight |
| olefins | 11% by weight |
| oxygen-containing substances | 1% by weight |

After this hydrotreatment, the contents of olefins, oxygen-containing substances and nitrogen-containing compounds of the effluent fall below detection thresholds, while the conversion of the 370° C.$^+$ fraction into the 370° C.$^-$ fraction is negligible (less than 5% by weight); see Table 2. The carbon monoxide and/or carbon dioxide and/or the water and/or the ammonia formed during the hydrotreatment are eliminated by a flashing and decanting step c).

TABLE 2

| Features of the heavy fraction after hydrotreatment | |
|---|---|
| Simulated distillation | T (5% by weight): 172° C. |
|  | T (25% by weight): 242° C. |
|  | T (50% by weight): 343° C. |
|  | T (75% by weight): 441° C. |
|  | T (95% by weight): 568° C. |

TABLE 2-continued

Features of the heavy fraction after hydrotreatment

| | |
|---|---|
| 370° C.+ compounds (by GC) | 41% by weight |
| Density at 15° C. | 0.797 |
| Nitrogen content | <detection limit |
| Sulphur content | <detection limit |
| Detailed analysis of the $C_{30}^-$ fraction (GC) | |
| n-paraffins | 91% by weight |
| i-paraffins | 9% by weight |
| olefins | <detection limit |
| oxygen-containing substances | <detection limit |

The hydrotreatment effluent forms the hydrocracking feedstock sent in a step d) on the hydrocracking catalyst C4 according to the invention.

Prior to the test, the catalyst C4 undergoes a reduction step under the following operating conditions:

hydrogen flow rate: 1,600 normal liters per hour and per liter of catalyst, rise from ambient temperature to 120° C.: 10° C./min, one-hour stage at 120° C., rise from 120° C. to 450° C. at 5° C./min, two-hour stage at 450° C., pressure: 1 bar After reduction, the catalytic test is carried out under the following conditions:

total pressure of 60 bar, $H_2$-to-feedstock ratio of 1,000 normal liters/liter, hourly volume velocity (HVV) equal to 1 $h^{-1}$ The 370° C.+ fraction is converted equal to:

$$C(370°\ C.^+) = [(\%\ of\ 370°\ C.^-_{effluents}) - (\%\ of\ 370°\ C._{feedstock})] / [100 - (\%\ of\ 370°\ C.^-_{feedstock})]$$

wherein % of 370° $C._{effluents}^-$=content by mass of compounds having boiling points of lower than 370° C. in the effluents, and % of 370° $C._{feedstock}^-$=content by mass of compounds having boiling points of lower than 370° C. in the hydrocracking feedstock The reaction temperature is adjusted so as to obtain a level of conversion of the 370° C.+ fraction equal to 80% by weight.

In a step e), the hydrocracked fraction is distilled in order to obtain middle distillates and the residual fraction boiling above said middle distillates is recycled in the hydrocracking step d) according to the invention.

The analyses by gas chromatography provide the distribution of the various cuts in the hydrocracked effluent (Table 3):

$C_1$-$C_4$ cut: hydrocarbons containing 1 to 4 carbon atoms included $C_5$-$C_9$ cut: hydrocarbons containing 5 to 9 carbon atoms included (naphtha cut)

$C_{10}$-$C_{14}$ cut: hydrocarbons containing 10 to 14 carbon atoms included (kerosene cut)

$C_{15}$-$C_{22}$ cut: hydrocarbons containing 15 to 22 carbon atoms included (gas oil cut)

$C_{22+}$ cut: hydrocarbons containing more than 22 carbon atoms included (370° C.+ cut)

TABLE 3

Distribution by cuts of the hydrocracked effluent. (GC analysis)

| | % by weight |
|---|---|
| $C_1$-$C_4$ cut | 2.3 |
| $C_5$-$C_9$ cut | 19.8 |
| $C_{10}$-$C_{14}$ cut | 38.7 |
| $C_{15}$-$C_{22}$ cut | 31.0 |
| $C_{22}^+$ cut | 8.2 |

These results show that the use of a hydroisomerisation and hydrocracking catalyst according to the invention and in a process according to the invention allows middle distillates (kerosene and gas oil) to be produced by hydrocracking and hydroisomerisation of a paraffinic feedstock obtained by the Fischer-Tropsch synthesis process.

The invention claimed is:

1. Process for producing middle distillates from a paraffinic feedstock produced by Fischer-Tropsch synthesis, implementing a hydrocracking and hydroisomerisation catalyst comprising at least one hydro-dehydrogenating metal selected from the group formed by the metals from group VIB and from group VIII of the periodic table and a substrate comprising at least one crystallised IZM-2 solid displaying an X-ray diffraction pattern including at least the rays listed in the table hereinafter:

| 2 theta (°) | dhkl (Å) | Irel |
|---|---|---|
| 5.07 | 17.43 | ww |
| 7.36 | 12.01 | ss |
| 7.67 | 11.52 | ss |
| 8.78 | 10.07 | s |
| 10.02 | 8.82 | ww |
| 12.13 | 7.29 | ww |
| 14.76 | 6.00 | ww |
| 15.31 | 5.78 | ww |
| 15.62 | 5.67 | ww |
| 16.03 | 5.52 | ww |
| 17.60 | 5.03 | ww |
| 18.22 | 4.87 | ww |
| 19.01 | 4.66 | ww |
| 19.52 | 4.54 | ww |
| 21.29 | 4.17 | m |
| 22.44 | 3.96 | w |
| 23.10 | 3.85 | mw |
| 23.57 | 3.77 | w |
| 24.65 | 3.61 | ww |
| 26.78 | 3.33 | w |
| 29.33 | 3.04 | ww |
| 33.06 | 2.71 | ww |
| 36.82 | 2.44 | ww |
| 44.54 | 2.03 | ww | where ss=very strong; s=strong; m=moderate; mw=moderately weak; w=weak; ww=very weak and having a chemical composition, expressed on an anhydrous base, in terms of oxide moles, by the following general formula: $XO_2$:$aY_2O_3$:$bM_{2/n}O$, wherein X represents at least one tetravalent element, Y represents at least one trivalent element and M is at least one alkali metal and/or an alkaline earth metal of valency n, a and b representing respectively the number of moles of $Y_2O_3$ and $M_{2/n}O$ and a is between 0 and 0.5 and b is between 0 and 1 wherein the paraffinic feedstock are obtained from lignocellulosic feedstocks, oils, fats from vegetables or animals, or from mixtures thereof, and wherein the process operates a temperature from 320 to 420° C.

2. Process according to claim 1, wherein X is silicon.

3. Process according to claim 1, wherein Y is aluminium.

4. Process according to claim 1, wherein said hydrocracking and hydroisomerisation catalyst comprises 0.1 to 60% of at least one hydro-dehydrogenating metal selected from the group formed by the group VIE and group VIII metals, and from 40 to 99.9% of a substrate comprising:
0 to 99% of at least one oxide-type amorphous or poorly crystallised porous inorganic binder
0.01 to 60% of an IZM-2-type crystallised solid, the percentages being expressed in percentage by weight relative to the total mass of the catalyst.

5. Process according to claim 1, wherein the group VIII elements are selected from platinum and palladium.

6. Process according to claim 1, wherein the group VIII elements are selected from iron, cobalt and nickel.

7. Process according to claim 1, wherein the group VIB elements are selected from tungsten and molybdenum.

8. Process according to claim 1, wherein the hydro-dehydrogenating element content of said catalyst selected from the group formed by the group VIB and group VIII metals is between 0.1 and 60% by weight relative to the total mass of said catalyst.

9. Process according to claim 1, wherein when the hydro-dehydrogenating element is a group VIII noble metal, the noble metal content is between 0.05 and 10% by weight relative to the total mass of said catalyst.

10. Process according to claim 1, wherein said catalyst also contains an oxide-type amorphous or poorly crystallised porous inorganic binder.

11. Process according to claim 10, wherein the binder is of the aluminium type.

12. Process according to claim 1, wherein said process operates at a temperature of between 270 and 400° C., a pressure of between 1 and 9 MPa, a space velocity of between 0.5 and 5 $h^{-1}$, a hydrogen flow rate adjusted to obtain a ratio of from 400 to 1,500 normal liters of hydrogen per liter of feedstock.

13. Process according to claim 1, wherein said process includes the following steps:
a) separating a single fraction, known as the heavy fraction, having an initial boiling point of between 120-200° C.,
b) hydrotreating at least a portion of said heavy fraction,
c) fractionation into at least 3 fractions:
at least one intermediate fraction having an initial boiling point T1 of between 120 and 200° C., and a final boiling point T2 of higher than 300° C. and lower than 410° C.,
at least one light fraction boiling below the intermediate fraction,
at least one heavy fraction boiling above the intermediate fraction;
d) passing at least a portion of said intermediate fraction over a hydroisomerising catalyst,
e) passing at least a portion of said heavy fraction in the process according to the invention,
f) distilling the hydrocracked and hydroisomerised fractions to obtain middle distillates, and recycling the residual fraction boiling above said middle distillates in step (e).

14. Process according to claim 1, wherein said process includes the following steps:
a) separating at least one light fraction of the feedstock so as to obtain a single fraction, known as the heavy fraction, having an initial boiling point of between 120-200° C.,
b) optionally hydrotreating said heavy fraction, optionally followed by a step
c) for removing at least a portion of the water and optionally CO, $CO_2$, $NH_3$, $H_2S$,
d) passing in the process according to the invention at least a portion of said optionally hydrotreated fraction, the conversion on the catalyst according to the invention described hereinbefore of the products having boiling points of higher than or equal to 370° C. into products having boiling points of lower than 370° C. is greater than 40% by weight,
e) distilling the hydrocracked and hydroisomerised fraction to obtain middle distillates, and recycling in step d) the residual fraction boiling above said middle distillates.

15. Process according to claim 1, wherein said process includes the following steps:
a) fractionating the feedstock into at least 3 fractions:
at least one intermediate fraction having an initial boiling point T1 of between 120 and 200° C., and a final boiling point T2 of higher than 300° C. and lower than 410° C.,
at least one light fraction boiling below the intermediate fraction,
at least one heavy fraction boiling above the intermediate fraction;
b) hydrotreating at least a portion of said intermediate fraction, then passing in a treatment process at least a portion of the hydrotreated fraction over a hydroisomerising catalyst;
c) eliminating at least a portion of the water produced during the hydrotreatment reactions and optionally CO, $CO_2$, $NH_3$, $H_2S$;
d) passing in the process according to the invention at least a portion of said heavy fraction with a conversion of the 370° C.$^+$ products into 370° C.$^-$ products of greater than 40% by weight;
e) and f) distilling at least a portion of the hydrocracked and hydroisomerised fractions to obtain middle distillates.

16. Process according to claim 1, wherein said process includes the following steps:
a) optionally fractionating the feedstock into at least one heavy fraction having an initial boiling point of between 120 and 200° C., and at least one light fraction boiling below said heavy fraction,
b) optionally hydrotreating at least a portion of the feedstock or the heavy fraction, optionally followed by
c) eliminating at least a portion of the water,
d) passing at least a portion of the effluent or the fraction, optionally hydrotreated in the process according to the invention, over a first catalyst according to the invention,
e) distilling the hydroisomerised and hydrocracked effluent to obtain middle distillates and a residual fraction boiling above the middle distillates,
f) passing at least a portion of said residual heavy fraction and/or a portion of said middle distillates, and distilling the resulting effluent to obtain middle distillates in the process according to the invention over a second catalyst according to the invention.

* * * * *